US010880718B2

(12) United States Patent
Kim et al.

(10) Patent No.: US 10,880,718 B2
(45) Date of Patent: Dec. 29, 2020

(54) APPARATUS AND METHOD FOR DECODING SIGNAL IN WIRELESS COMMUNICATION SYSTEM

(71) Applicants: Samsung Electronics Co., Ltd, Suwon-si (KR); Industry-Academic Cooperation Foundation, Yonsei University, Seoul (KR)

(72) Inventors: Chanhong Kim, Suwon-si (KR); Yonggue Han, Seoul (KR); Yeonghwan Kim, Seoul (KR); Chungyong Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1 day.

(21) Appl. No.: 16/020,686

(22) Filed: Jun. 27, 2018

(65) Prior Publication Data
US 2018/0376316 A1 Dec. 27, 2018

(30) Foreign Application Priority Data
Jun. 27, 2017 (KR) .......................... 10-2017-0081002

(51) Int. Cl.
*H04W 4/00* (2018.01)
*H04W 8/00* (2009.01)
(52) U.S. Cl.
CPC .................................. *H04W 8/005* (2013.01)

(58) Field of Classification Search
CPC ..... H04W 88/16; H04W 76/14; H04W 88/06; H04W 8/005; H04W 24/02
See application file for complete search history.

(56) References Cited

U.S. PATENT DOCUMENTS

| 2001/0033248 A1* | 10/2001 | Owechko | ............... H04B 7/024 342/371 |
| 2002/0057295 A1* | 5/2002 | Panasyuk | ............... G06F 9/451 715/804 |
| 2006/0046672 A1 | 3/2006 | Kalhan et al. | |
| 2006/0074566 A1* | 4/2006 | Najarian | ............... G16B 25/00 702/20 |

(Continued)

OTHER PUBLICATIONS

H. Agirman-Tosun et al., "Modulation Classification of MIMO-OFDM Signals by Independent Component Analysis and Support Vector Machines", IEEE, Asilomar 2011, p. 1903-1907.

(Continued)

*Primary Examiner* — Atique Ahmed

(57) ABSTRACT

The present disclosure relates to a pre-5th-Generation (5G) or 5G communication system for supporting higher data rates Beyond 4th-Generation (4G) communication system such as Long Term Evolution (LTE). A method of operating a receiving terminal in a wireless communication system may include: transmitting, to a transmitting terminal, information on capabilities of the receiving terminal in relation to an independent component analysis (ICA) technique; receiving, from the transmitting terminal, a signal generated based on the capabilities; and decoding the signal using the ICA technique in consideration of the amount of change in the channel for the signal.

12 Claims, 31 Drawing Sheets

(56) References Cited

U.S. PATENT DOCUMENTS

| | | | |
|---|---|---|---|
| 2007/0189427 A1* | 8/2007 | Haghighat | H04L 25/03019 |
| | | | 375/350 |
| 2007/0211836 A1 | 9/2007 | Chitrapu et al. | |
| 2007/0253464 A1* | 11/2007 | Hori | H04B 1/7105 |
| | | | 375/130 |
| 2008/0055068 A1* | 3/2008 | Van Wageningen | |
| | | | H04W 52/10 |
| | | | 340/539.3 |
| 2008/0181097 A1* | 7/2008 | Goldberg | H04L 25/0236 |
| | | | 370/210 |
| 2017/0339258 A1* | 11/2017 | Momchilov | H04L 69/18 |

OTHER PUBLICATIONS

Aditya K. Jagannatham et al., "Whitening-Rotation-Based Semi-Blind MIMO Channel Estimation", IEEE Transactions on Signal Processing, vol. 54, No. 3, Mar. 2006, p. 861-869.

* cited by examiner

APPARATUS AND METHOD FOR DECODING SIGNAL IN WIRELESS COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0081002 filed on Jun. 27, 2017 in the Korean Intellectual Property Office, the disclosure of which is incorporated herein by reference in its entirety.

BACKGROUND

1. Field

The present disclosure generally relates to a wireless communication system and, more specifically, to an apparatus and a method for decoding signals.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The use of an Independent Component Analysis (ICA) technique may be considered in 5G systems. The ICA technique is a reception signal detection technique that utilizes the statistical characteristics of signals. Since the ICA utilizes the statistical characteristics of signals, it has a relatively good performance under the condition that the channel is required to be maintained. A sufficient number of reception signal samples are required in order to apply the ICA, and thus the symbols allocated to various times and frequency resources are collected and processed together. The channel varies with time and frequency in an actual wireless communication environment, but the ICA decodes signals after assuming a consistent channel.

Based on the above discussion, the present disclosure provides an apparatus and a method for decoding signals in a wireless communication system.

SUMMARY

According to various embodiments of the present disclosure, a method of operating a receiving terminal in a wireless communication system may include: transmitting, to a transmitting terminal, information on capabilities of the receiving terminal in relation to an independent component analysis (ICA) technique; receiving a signal generated based on the capabilities from the transmitting terminal; and decoding the signal using the ICA technique in consideration of the amount of change in the channel for the signal.

According to various embodiments of the present disclosure, a method of operating a transmitting terminal in a wireless communication system may include: receiving, from a receiving terminal, information on capabilities of the receiving terminal in relation to an independent component analysis (ICA) technique; and transmitting, to the receiving terminal, a signal generated based on the information on the capabilities in relation to the ICA technique. The signal may be decoded by the receiving terminal using the ICA technique in consideration of the amount of change in the channel.

According to various embodiments of the present disclosure, a receiving terminal device in a wireless communication system may include: a transceiver; and at least one processor configured to be operatively connected to the transceiver, wherein the at least one processor may perform control so as to: transmit, to a transmitting terminal, information on capabilities of the receiving terminal in relation to an independent component analysis (ICA) technique; receive a signal generated based on the capabilities from the transmitting terminal; and decode the signal using the ICA technique in consideration of the amount of change in the channel for the signal.

According to various embodiments of the present disclosure, a transmitting terminal device in a wireless communication system may include: a transceiver; and at least one processor configured to be operatively connected to the transceiver, wherein the at least one processor may perform control so as to: receive, from a receiving terminal, information on capabilities of the receiving terminal in relation to an independent component analysis (ICA) technique; and transmit, to the receiving terminal, a signal generated based on the information on the capabilities in relation to the ICA technique. The signal may be decoded by the receiving terminal using the ICA technique in consideration of the amount of change in the channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
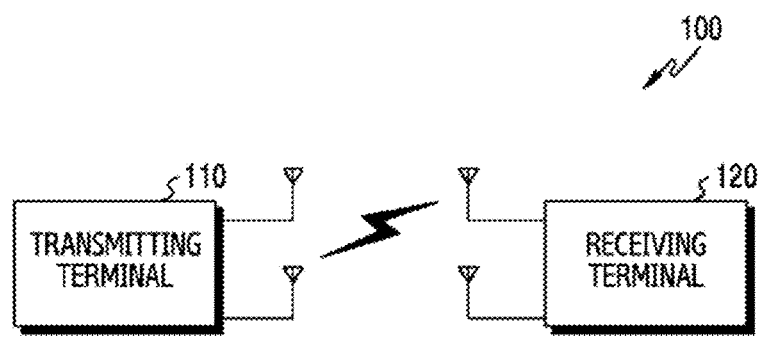
FIG. 1 illustrates an example of a wireless communication system according to various embodiments of the present disclosure.

FIGS. 1 through 22C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to an apparatus and a method for decoding signals in a wireless communication system. In particular, the present disclosure describes technology for detecting signals using an independent component analysis (ICA) technique.

The terms referring to resource areas (e.g., ICA block and central area), the terms referring to messages or control information {e.g., channel selectivity indicator (CSI), center extraction indicator (CEI), ICA block size indicator (IBSI), and reference signal pattern indicator (RPI)}, and the terms referring to components of an apparatus, which are used hereinafter, are illustrative words for the convenience of explanation. Accordingly, the present disclosure is not limited to the terms described later, and other terms having equivalent technical meanings can be used.

The present disclosure provides an apparatus and a method for decoding signals by performing independent component analysis (ICA) based on the amount of change in the channel in a wireless communication system.

The present disclosure provides an apparatus and a method for determining the size of an ICA block, based on the amount of change in the channel in a wireless communication system.

The present disclosure provides an apparatus and a method for determining a reference signal (RS) pattern, based on the amount of change in the channel in a wireless communication system.

The present disclosure provides an apparatus and a method for extracting a central area of an ICA block, based on the amount of change in the channel in a wireless communication system.

In addition, the present disclosure provides an apparatus and a method for compensating for a reception signal, based on the amount of change in the channel in a wireless communication system.

An apparatus and a method according to various embodiments of the present disclosure may perform independent component analysis (ICA) in consideration of the amount of change in the channel, thereby improving the performance of ICA in an environment in which a channel varies with time and frequency.

Effects which can be acquired by the present disclosure are not limited to the above described effects, and other effects that have not been mentioned may be clearly understood by those skilled in the art from the following description.

FIG. 1 illustrates a wireless communication system according to various embodiments of the present disclosure. FIG. 1 illustrates a transmitting terminal 110 and a receiving terminal 120 as parts of nodes using a wireless channel in a wireless communication system. Although FIG. 1 illustrates a single transmitting terminal 110 and a single receiving terminal 120, a plurality of transmitting terminals or a plurality of receiving terminals may be provided. For the convenience of explanation, the transmitting terminal 110 and the receiving terminal 120 will be described as separate entities, but the functions of the transmitting terminal 110 and the receiving terminal 120 may be exchanged. For example, in the case of an uplink of a cellular communication system, the transmitting terminal 110 may be a terminal and the receiving terminal 120 may be a base station, and in the case of a downlink thereof, the transmitting terminal 110 may be a base station and the receiving terminal 120 may be a terminal.

The transmitting terminal 110 may transmit signals to the receiving terminal 120. The receiving terminal 120 may receive signals from the transmitting terminal 110, and may then decode the received signals using an ICA technique. In this case, since the channel changes with time and frequency, the receiving terminal 120 may decode signals using the ICA technique in consideration of the amount of change in the channel for a time domain and a frequency domain, thereby improving decoding performance.

Figure 2:
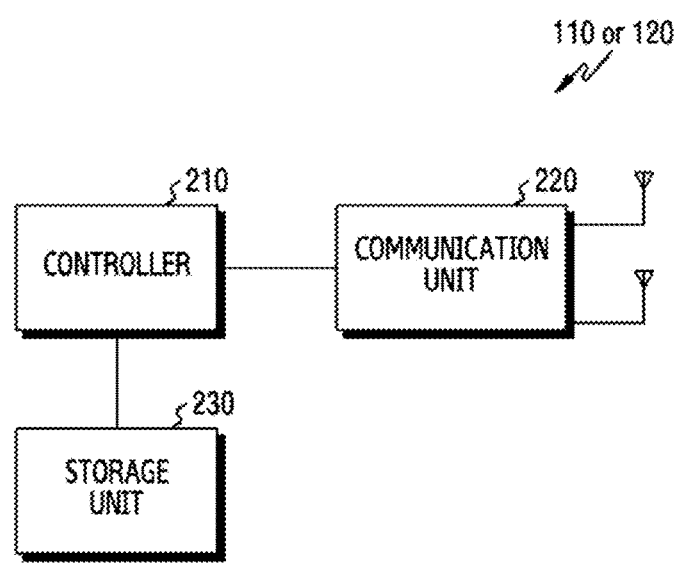
FIG. 2 illustrates an example of a configuration of an apparatus in a wireless communication system according to various embodiments of the present disclosure.

FIG. 2 illustrates a configuration of an apparatus in a wireless communication system according to various embodiments of the present disclosure. That is, the configuration illustrated in FIG. 2 may be regarded as a configuration of the transmitting terminal 110 or the receiving terminal 120. Hereinafter, the term "-unit", "-or(er)", or the like denotes a unit for processing at least one function or operation, and may be implemented by hardware, software, or a combination thereof.

Referring to FIG. 2, the apparatus may include a controller 210, a communication unit 220, and a storage unit 230.

The controller 210 may control the overall operation of the apparatus. For example, the controller 210 may transmit and receive signals through the communication unit 220. The controller 210 can write or read data to or from the storage unit 230. To this end, the controller 210 may include at least one processor or microprocessor, or may be a part of a processor. A part of the communication unit 220 and the controller 210 may be referred to as a communication processor (CP). In other words, the controller 210 may control the operation of each of the components included in the communication unit 220. For example, the controller 210 may perform control such that the transmitting terminal 110 or the receiving terminal 120 performs operations according to various embodiments described below.

The communication unit 220 may perform functions for transmitting and receiving signals through a wireless channel. For example, the communication unit 220 may perform a function of transformation between a baseband signal and a bit stream according to the physical layer specification of a system. For example, in the case of data transmission, the communication unit 220 may generate complex symbols by encoding and modulating a transmission bit stream. In the case of data reception, the communication unit 220 may restore a reception bit stream by demodulating and decoding a baseband signal. In addition, the communication unit 220 may up-convert a baseband signal to a radio frequency (RF) band signal to thus transmit the same through an antenna, and may down-convert an RF band signal received through an antenna to a baseband signal.

To this end, the communication unit 220 may include a transmitting filter, a receiving filter, an amplifier, a mixer, an oscillator, a digital-to-analog convertor (DAC), an analogto-digital convertor (ADC), and the like. In addition, the communication unit 220 may include a plurality of transmission/reception paths. Further, the communication unit 220 may include at least one antenna array including a plurality of antenna elements. In terms of hardware, the communication unit 220 may include a digital unit and an analog unit, and the analog unit may include a plurality of sub-units depending on operation power, operation frequency, and the like.

The communication unit 220 transmits and receives signals as described above. Accordingly, the communication unit 220 may be referred to as a "transmitting unit", a "receiving unit", or a "transmitting/receiving unit". In the following description, the transmission and reception performed through a wireless channel will be used to encompass the execution of the process by the communication unit 220 as described above. The communication unit 220 may include a backhaul communication unit for communication with other network entities connected through a backhaul network.

The storage unit 230 may store data such as fundamental programs, application programs, and configuration information for the operation of the apparatus. The storage unit 230 may be configured as a volatile memory, a non-volatile memory, or a combination thereof. In addition, the storage unit 230 may provide the stored data upon request by the controller 210.

Figure 3:
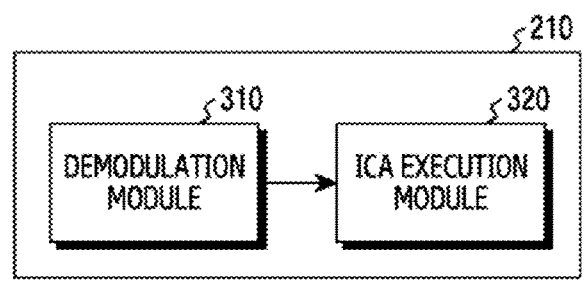
FIG. 3 illustrates an example of a configuration of a controller of a receiving terminal in a wireless communication system according to various embodiments of the present disclosure.

FIG. 3 illustrates an example of a configuration of a controller of a receiving terminal 120 in a wireless communication system according to various embodiments of the present disclosure. The configuration illustrated in FIG. 3 may be regarded as a partial configuration of the controller 210.

Referring to FIG. 3, the controller 210 may include a demodulation module 310 and an ICA execution module 320.

The demodulation module 310 may perform a function of returning a modulated signal to an original signal. For example, the modulated signal may be demodulated based on orthogonal frequency division multiplexing (OFDM) technology. The demodulation module 310 may transmit demodulated signals to the ICA execution module 320, wherein the transmitted signals may include signals from which the influence of a channel has not yet been removed. For example, the signals, from which the influence of a channel has not yet been removed, may include a signal that has not been equalized for a channel. More specifically, the transmitted signals may include a signal in a symbol level of a baseband, from which the influence of a channel has not yet been removed.

The ICA execution module 320 may perform ICA on the signal from which the influence of a channel has not been removed. The ICA may refer to a technique for estimating a signal transmitted from the transmitting terminal 110 to the receiving terminal 120 (i.e., a transmission signal) using the statistical characteristics of a signal received by the receiving terminal 120 from the transmitting terminal 110 (i.e., a reception signal). The influence of the channel on the signals may be removed by the execution of ICA. That is, the signals, on which the ICA has been performed, may include a signal in a symbol level of a baseband, from which the influence of a channel has been removed. The execution of ICA may include a whitening process using covariance, which is the secondary statistical characteristic of the reception signal, and a rotating process using kurtosis, which is the fourth statistical characteristic. In this case, referring to Equation 1 below, there is a problem of ambiguity in which phase and permutation cannot be accurately distinguished.

$$y = Hx \qquad \text{[Equation 1]}$$
$$= \left(\frac{1}{\alpha}H\right) \cdot (\alpha x), |\alpha| = 1$$
$$= (HP^{-1}) \cdot (Px), P: \text{Permutation matrix}$$

Here, "y" denotes the reception signal, "H" denotes the channel, and "x" denotes the transmission signal. In this case, the phase ambiguity is a problem in which it is difficult to distinguish the transmission signal (x) from αx obtained by multiplying the transmission signal (x) by a complex number α having a magnitude of 1. The permutation ambiguity is a problem in which it is difficult to distinguish the transmission signal (x) from Px obtained by multiplying the transmission signal (x) by a permutation matrix P. In the case of ICA, some of a multitude of available RSs may be used in order to solve the above-mentioned ambiguity problems. For example, in the case of ICA, fewer RSs than the number of RSs used in LTE (Long Term Evolution) may be used. That is, unlike the demodulation reference signal (DMRS) used for direct channel estimation in LTE, the RS may be used in the ICA in order to solve the ambiguity problems through correlation comparison.

Figure 4:
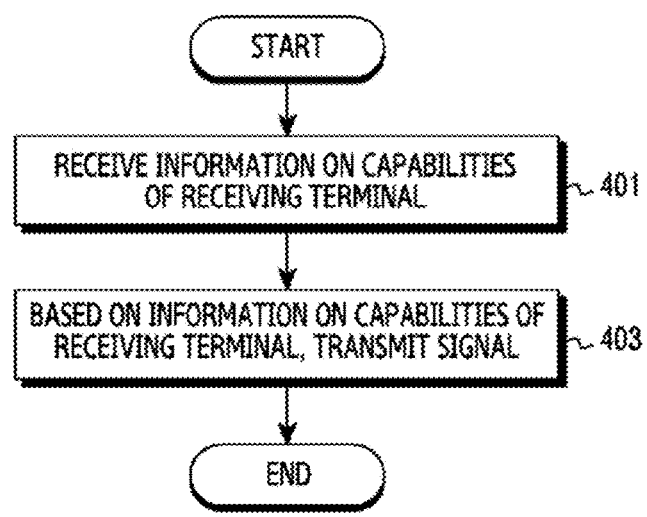
FIG. 4 illustrates an operating method of a transmitting terminal for transmitting signals in a wireless communication system according to various embodiments of the present disclosure.

FIG. 4 illustrates an operating method of a transmitting terminal 110 for transmitting signals in a wireless communication system according to various embodiments of the present disclosure.

Referring to FIG. 4, in operation 401, the transmitting terminal 110 may receive, from the receiving terminal 120, information related to capabilities of the receiving terminal 120. For example, the information related to the capabilities of the receiving terminal 120 may include information indicating whether or not the receiving terminal 120 supports ICA. For example, the information indicating whether or not the receiving terminal 120 supports ICA may include at least one part of information explicitly indicating whether or not the receiving terminal 120 supports ICA, information indicating whether or not the receiving terminal 120 supports other capabilities for supporting ICA, and information indicating whether or not the receiving terminal 120 supports at least one capability related to the ICA (for example, whether or not the receiving terminal can perform extraction of a central area and decoding, whether or not the receiving terminal can compensate to a reception signal, or the like). In some embodiments, the transmitting terminal 110 may make a request to the receiving terminal 120 for information related to the capabilities of the receiving terminal 120, and may receive, as a response to the request, the information related to the capabilities of the receiving terminal 120. In other embodiments, the transmitting terminal 110 may receive, from the receiving terminal 120, the information related to the capabilities of the receiving terminal 120 without any further request in the process of initial access to the receiving terminal 120.

In operation 403, based on the information related to the capabilities of the receiving terminal 120, the transmitting terminal 110 may transmit a signal to the receiving terminal 120. For example, in the case where the receiving terminal 120 supports an ICA technique, the transmitting terminal 110 may generate and transmit a transmission signal in consideration of the size of an ICA block and disposition of RSs.

In some embodiments, there may be a situation in which a receiving terminal that supports ICA and a receiving terminal that does not support ICA are mixed. In this case, the transmitting terminal and the receiving terminals may perform negotiation on the capabilities of the receiving terminals. More specifically, the transmitting terminal may make a request to the receiving terminal for information on capabilities of the receiving terminal, and, in response thereto, the receiving terminal may transmit information on capabilities of the receiving terminal to the transmitting terminal. For example, in the case where the transmitting terminal and the receiving terminal act as a base station that supports ICA (hereinafter, referred to as a "ICA base station") or a base station that does not support ICA (hereinafter, referred to as a "legacy base station") and a terminal that supports ICA (hereinafter, referred to as a "ICA terminal") or a terminal that does not support ICA (hereinafter, referred to as a "legacy terminal"), respectively, negotiation on the capabilities of the terminal may be performed as shown in Tables 1 and 2 below. That is, Table 1 may show a negotiation procedure for the capabilities of the terminal in the uplink, and Table 2 may show a negotiation procedure for the capabilities of the terminal in the downlink.

TABLE 1

| Situation | Receiving terminal | Transmitting terminal | Negotiation procedure |
|---|---|---|---|
| 1-1 | ICA base station | ICA terminal | request(O) → response(O) → operate as ICA<br>request(O) → response(X) → operate as legacy |
| 1-2 | ICA base station | Legacy terminal | request(O) → response(X) → operate as legacy<br>request(O) → response(X) → operate as ICA |
| 1-3 | Legacy base station | ICA terminal or legacy terminal | request(X) → response(X) → operate as legacy |

Here, the request (O) may mean that the base station makes a request to the terminal for information on whether or not the terminal supports ICA. The request (X) may mean that the ICA base station does not make a request to the terminal for information on whether or not the terminal supports ICA. The response (O) may mean that the terminal transmits, to the base station, information stating that the terminal supports ICA. The response (X) may mean that the terminal transmits, to the base station, information stating that the terminal does not support ICA.

In situation 1-1, when the terminal transmits a response (O) to the ICA base station, the terminal may operate as an ICA terminal. In the case where the terminal transmits a response (X) to the ICA base station, the terminal may operate as a legacy terminal. In this case, the response (X) may refer to a response in the case where the terminal cannot support ICA even though the terminal is designed to support ICA.

In situation 1-2, when the terminal transmits a response (X) to the ICA base station, the terminal may operate as a legacy terminal. In this case, the base station may operate as a legacy base station or an ICA base station. In the case of the terminal operating as an ICA base station, since the terminal and the base station have information on the RS used in LTE, if the base station uses the corresponding RS in order to solve the ambiguity problems of ICA, the base station may operate as an ICA base station. In some embodiments, it may be determined, based on the decoding performance and complexity of the base station, whether or not the base station operates as a legacy base station or an ICA base station.

Since the base station is a legacy base station in situation 1-3, there is no reason for performing a negotiation procedure on the capabilities of the terminal. Thus, the base station does not transmit a request, and the terminal does not transmit either a response thereto. As a result, the terminal may operate as a legacy terminal regardless of whether the terminal is an ICA terminal or a legacy terminal.

TABLE 2

| Situation | Transmitting terminal | Receiving terminal | Negotiation procedure |
|---|---|---|---|
| 2-1 | ICA base station | ICA terminal | request(O) → response(O) → operate as ICA<br>request(O) → response(X) → operate as legacy |
| 2-2 | ICA base station | Legacy terminal | request(O) → response(X) → operate as legacy |
| 2-3 | Legacy base station | ICA terminal | request(X) → response(X) → operate as legacy<br>request(X) → response(X) → operate as ICA |
| 2-4 | Legacy base station | Legacy terminal | request(X) → response(X) → operate as legacy |

In situation 2-1, when the terminal transmits a response (O) to the ICA base station, the terminal may operate as an ICA terminal. In the case where the terminal transmits a response (X) to the ICA base station, the terminal may operate as a legacy terminal. In this case, the response (X) may refer to a response in the case where the terminal cannot support ICA even though the terminal is designed to support ICA.

In situation 2-2, when the terminal transmits a response (X) to the ICA base station, the terminal may operate as a legacy terminal.

In situation 2-3, since the base station does not transmit a request and the terminal does not transmit either a response thereto, the terminal may operate as a legacy terminal. However, since the terminal and the base station have information on the RS used in LTE, if the terminal uses the corresponding RS in order to solve the ambiguity problems of ICA, the terminal may operate as an ICA terminal. It may be determined, based on the decoding performance and complexity of the terminal, whether or not the terminal operates as a legacy terminal or an ICA terminal.

Since the base station is a legacy base station in situation 2-4, there is no reason for performing a negotiation procedure on the capabilities of the terminal. Thus, since the base station does not transmit a request and the terminal does not transmit either a response thereto, the terminal may operate as a legacy terminal.

Figure 5:
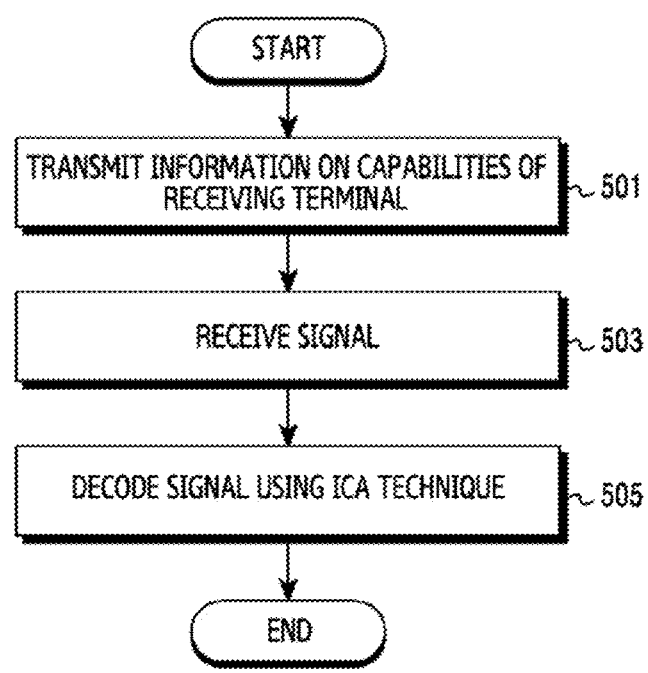
FIG. 5 illustrates an operating method of a receiving terminal for decoding signals using independent component analysis (ICA) in a wireless communication system according to various embodiments of the present disclosure.

FIG. 5 illustrates an operating method of a receiving terminal 120 for decoding signals using independent component analysis (ICA) in a wireless communication system according to various embodiments of the present disclosure.

Referring to FIG. 5, in operation 501, the receiving terminal 120 may transmit, to the transmitting terminal 110, information related to capabilities of the receiving terminal 120. For example, the information related to the capabilities of the receiving terminal 120 may refer to information indicating whether or not the receiving terminal 120 supports ICA.

In operation 503, the receiving terminal 120 may receive a signal from the transmitting terminal 110. The signal may refer to a signal that is generated, based on the information related to the capabilities of the receiving terminal 120, by the transmitting terminal 110.

In operation 505, the receiving terminal 120 may decode the signal using an ICA technique. The ICA technique may be performed in consideration of the amount of change in the channel. The amount of change in the channel may denote the amount of change in the value for a channel in a time domain and a frequency domain. The amount of change in the channel may be referred to as "channel selectivity" or other names having equivalent technical meanings. In this case, the receiving terminal 120 may decode the signal using the ICA technique in consideration of the amount of change in the channel according to time and frequency, thereby improving decoding performance of the receiving terminal 120.

Figure 6:
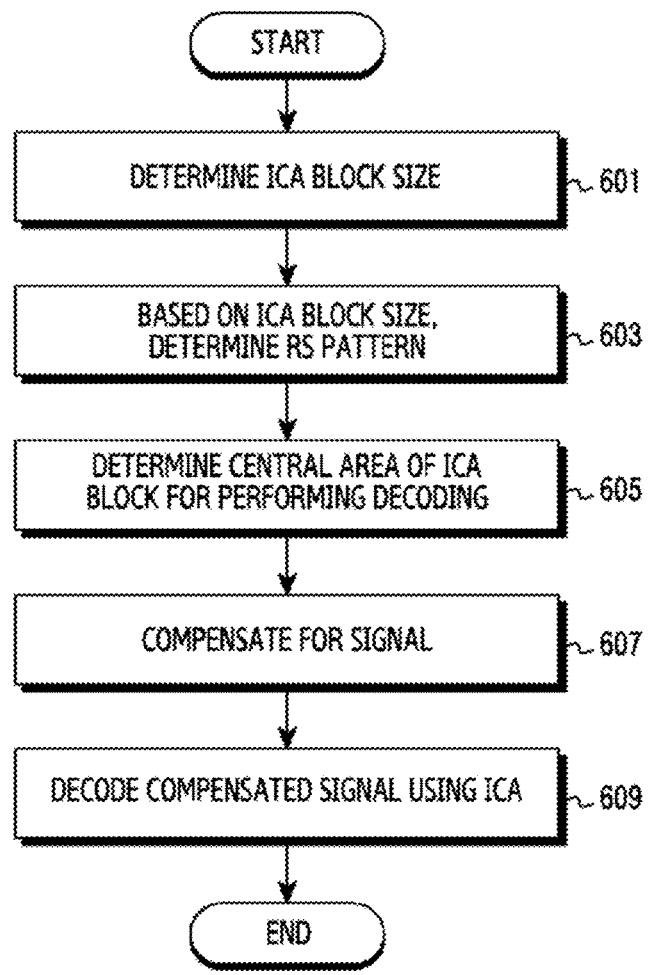
FIG. 6 illustrates another operating method of a receiving terminal for decoding signals using an ICA technique in a wireless communication system according to various embodiments of the present disclosure.

FIG. 6 illustrates another operating method of a receiving terminal 120 for decoding signals using an ICA technique in a wireless communication system according to various embodiments of the present disclosure. The procedure shown in FIG. 6 may be regarded as a detailed example of operation 505.

Referring to FIG. 6, in operation 601, the receiving terminal 120, based on the amount of change in the channel, may determine the size of an ICA block. Here, the size of an ICA block may denote the size of a resource area in which at least one reception signal sample used for one-time ICA execution is located. In some embodiments, the ICA block may refer to a resource block (RB). In this case, an operation of determining the size of an ICA block by the receiving terminal 120 may mean an operation of determining the size of an RB.

The ICA has the opposite features in which performance deteriorates depending on the amount of change in the channel and in which a large number of reception signal samples are used because the statistical characteristics of the reception signal are utilized. That is, in order to improve the performance of estimating a transmission signal of the ICA, it is important to acquire accurate statistical characteristics by obtaining a sufficient number of reception signal samples in an environment in which the channel does not vary depending on time and frequency. However, as the ICA block size increases in an environment in which the channel varies depending on time and frequency, the number of obtainable reception signal samples increases, and the amount of change in the channel increases in addition thereto. Thus, the receiving terminal 120 may adaptively adjust the ICA block size depending on the amount of change in the channel in order to adequately control the effects of the two features described above. Hereinafter, a channel that does not vary with time and frequency will be referred to as a "flat channel", and a channel that varies with time and frequency will be referred to as a "selective channel" for the convenience of explanation.

In operation 603, the receiving terminal 120, based on the ICA block size, may determine an RS pattern. That is, the receiving terminal 120 may dispose RSs at optimal positions according to the ICA block size in order to minimize the influence of the amount of change in the channel. Here, the RS pattern may denote disposition of the RSs in the ICA block.

Figure 7A:
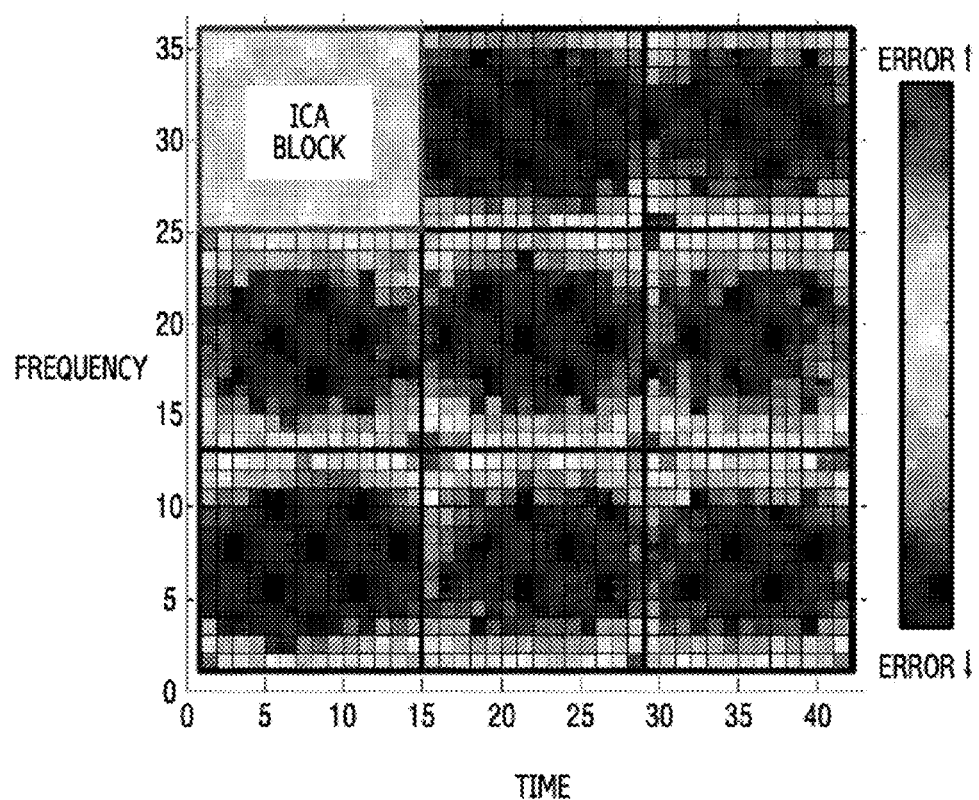
FIGS. 7A and 7B illustrate examples of error patterns resulting from the application of ICA in a wireless communication system according to various embodiments of the present disclosure.

In operation 605, the receiving terminal 120 may determine a central area of the ICA block for performing decoding. This is due to the fact that the ICA is performed in the unit of an ICA block because the ICA uses the statistical characteristics of the reception signal and that an error pattern of ICA is observed at the edge of the ICA block. Referring to FIG. 7A, the error pattern of ICA may occur mainly at the edge of the ICA block. In an environment in which the channel varies with time and frequency, the reception signal, which has passed through the selective channel, may be expressed as Equation 2.

$$y(f,t) = H(f,t)x(f,t) \quad \text{[Equation 2]}$$

Figure 7B:
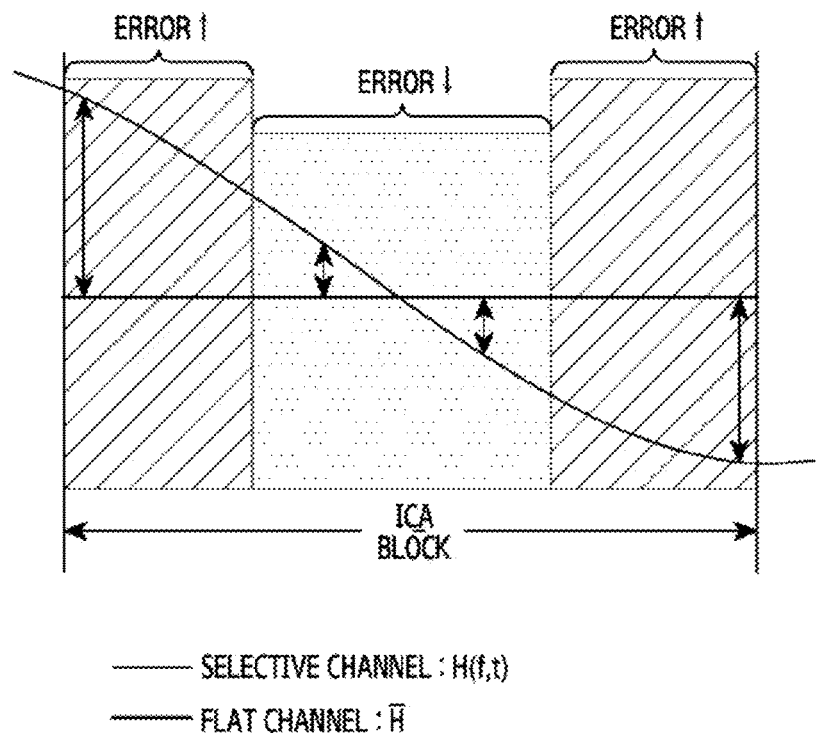

Here, y(f, t) denotes the reception signal, H(f, t) denotes the selective channel, and x(f, t) denotes the transmission signal. That is, the selective channel may vary with time and frequency. However, the ICA uses a flat channel in the process of estimating x(f, t) from y(f, t). Here, the flat channel may be expressed as $\overline{H}$. Referring to FIG. 7B, less errors occur in the central area of the ICA block because the selective channel and the flat channel are similar to each other, but the edge area of the ICA block has a higher possibility of occurrence of errors due to a big difference between the selective channel and the flat channel. Therefore, the receiving terminal 120 may extract the central area of the ICA block, which has a low possibility of occurrence of errors. The determined central area of the ICA block may refer to an area where decoding is performed. In some embodiments, operation 605 in FIG. 6 may be omitted.

Figure 8:
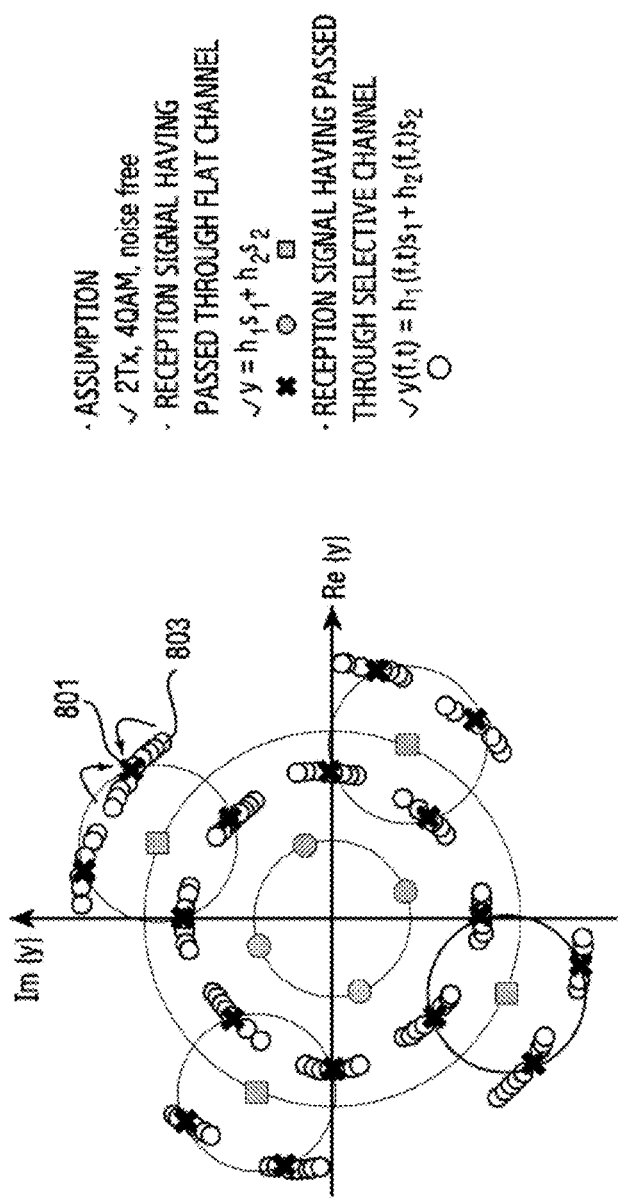
FIG. 8 illustrates an example of a constellation for compensation for a reception signal in a wireless communication system according to various embodiments of the present disclosure.

In operation 607, the receiving terminal 120, based on the amount of change in the channel, may compensate for a reception signal. That is, the reception signal, which has been transformed due to the amount of change in the channel, may be compensated for. FIG. 8 illustrates an example of constellation for compensating for a reception signal on the assumption of a noise-free wireless communication system in which the transmitting terminal 110 has two transmitting antennas and quadrature amplitude modulation (4QAM) is used. If the channel is a flat channel, the reception signal corresponds to the constellation point 801 (i.e., X). On the other hand, if the channel is a selective channel, the reception signal corresponds to the constellation point 803 (i.e., O). In this case, the receiving terminal 120 may compensate for a change occurring in the reception signal corresponding to the constellation point 803, and may return the same to the reception signal corresponding to the constellation point 801, thereby giving an effect of correcting the selective channel to the flat channel by correcting the amount of change in the channel. According to this, the receiving terminal 120 can reduce the performance degradation of ICA by compensating for the reception signal on the basis of the amount of change in the channel. In some embodiments, operation 607 in FIG. 6 may be omitted.

In operation 609, the receiving terminal 120 may decode the compensated reception signal using the ICA. That is, the receiving terminal 120 may estimate the transmission signal using the ICA technique for the compensated reception signal.

In some embodiments, at least one of operations 601 and 603 in FIG. 6 may be performed by the transmitting terminal 110. The detailed signaling procedure regarding the process of determining the size of an ICA block in operation 601 and the process of determining the RS pattern in operation 603 will be described later with reference to FIGS. 12A to 12C.

Figure 9:
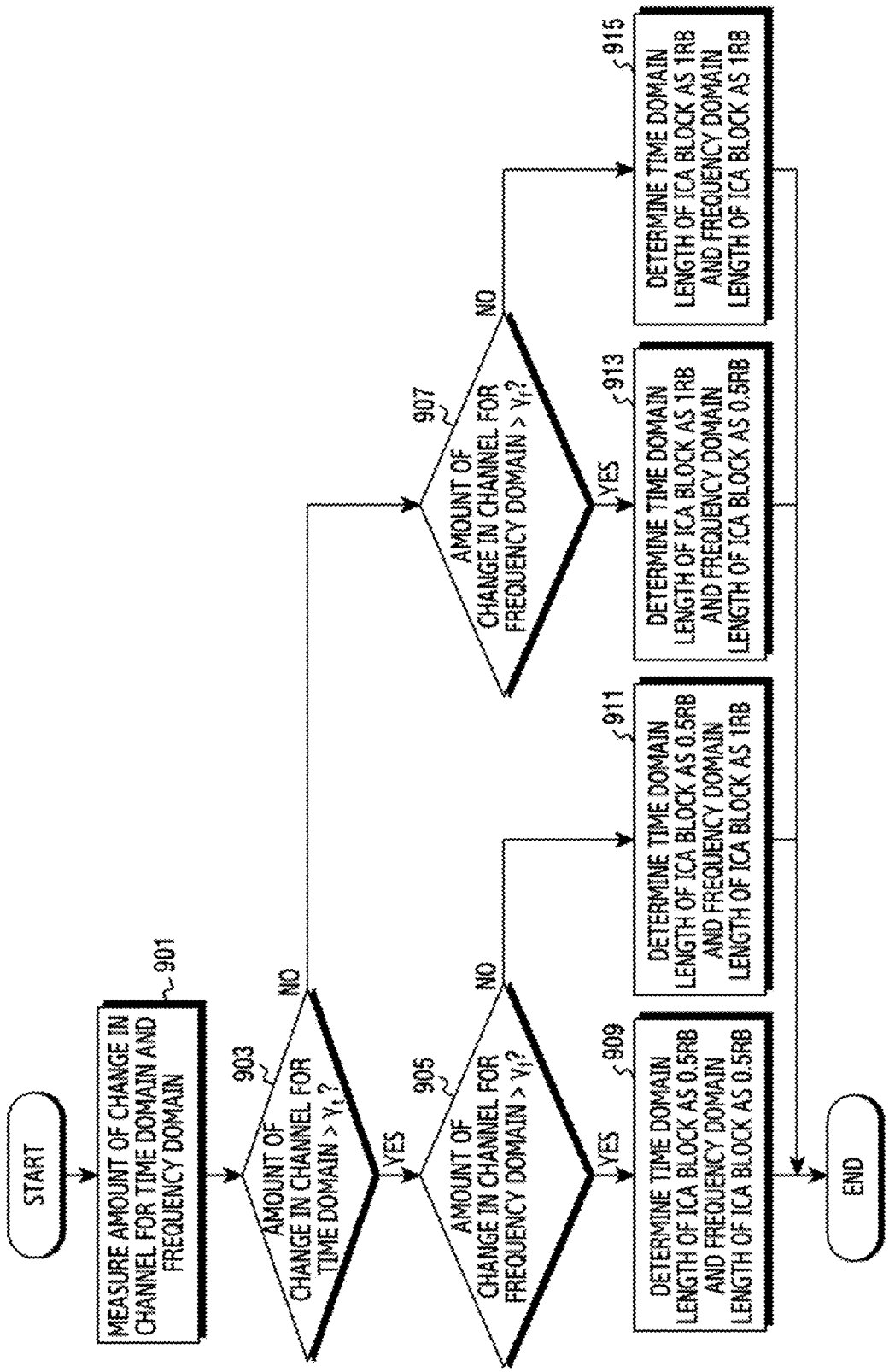
FIG. 9 illustrates an operating method of a receiving terminal for determining the size of an ICA block in a wireless communication system according to various embodiments of the present disclosure.

FIG. 9 illustrates an operating method of a receiving terminal 120 for determining the size of an ICA block in a wireless communication system according to various embodiments of the present disclosure. The procedure shown in FIG. 9 may be regarded as a detailed example of operation 601.

Referring to FIG. 9, the receiving terminal 120 may measure the amount of change in the channel for a time domain and a frequency domain in operation 901. In some embodiments, the receiving terminal 120 may determine a value of a channel that varies with time and a value of a channel that varies with frequency, respectively.

In operation 903, the receiving terminal 120 may determine whether or not the amount of change in the channel for a time domain is greater than a first threshold value $y_t$. In some embodiments, the first threshold value $y_t$ may be determined based on the capabilities of the receiving terminal 120.

In operation 905, the receiving terminal 120 may determine whether or not the amount of change in the channel for a frequency domain is greater than a second threshold value $\gamma_f$. Here, the second threshold value $\gamma_f$ may be the same as or different from the first threshold value $\gamma_t$.

In operation 907, the receiving terminal 120 may determine whether or not the amount of change in the channel for a frequency domain is greater than a second threshold value $\gamma_f$. In some embodiments, the second threshold value $\gamma_f$ may be determined based on the capabilities of the receiving terminal 120.

If the amount of change in the channel for a time domain is greater than the first threshold value $\gamma_t$, and if the amount of change in the channel for a frequency domain is greater than the second threshold value $\gamma_f$, the receiving terminal 120 may determine the time domain length of the ICA block to be 0.5 RB and the frequency domain length of the ICA block to be 0.5 RB in operation 909. This is intended to reduce the amount of change in the channel corresponding to the ICA block despite degradation of performance of the ICA caused by securing a relatively small number of reception signal samples because the amount of change in the channel is large in both the time domain and the frequency domain.

If the amount of change in the channel for a time domain is greater than the first threshold value $\gamma_t$, but if the amount of change in the channel for a frequency domain is not greater than the second threshold value $\gamma_f$, the receiving terminal 120 may determine the time domain length of the ICA block to be 0.5 RB and the frequency domain length of the ICA block to be 1 RB in operation 911.

If the amount of change in the channel for a time domain is not greater than the first threshold value $\gamma_t$, but if the amount of change in the channel for a frequency domain is greater than the second threshold value $\gamma_f$, the receiving terminal 120 may determine the time domain length of the ICA block to be 1 RB and the frequency domain length of the ICA block to be 0.5 RB in operation 913.

If the amount of change in the channel for a time domain is not greater than the first threshold value $\gamma_t$, and if the amount of change in the channel for a frequency domain is not greater than the second threshold value $\gamma_f$, the receiving terminal 120 may determine the time domain length of the ICA block to be 1 RB and the frequency domain length of the ICA block to be 1 RB in operation 915. This is intended to secure a relatively large number of reception signal samples by configuring a relatively large ICA block because the amount of change in the channel is small in both the time domain and the frequency domain.

Figure 10:
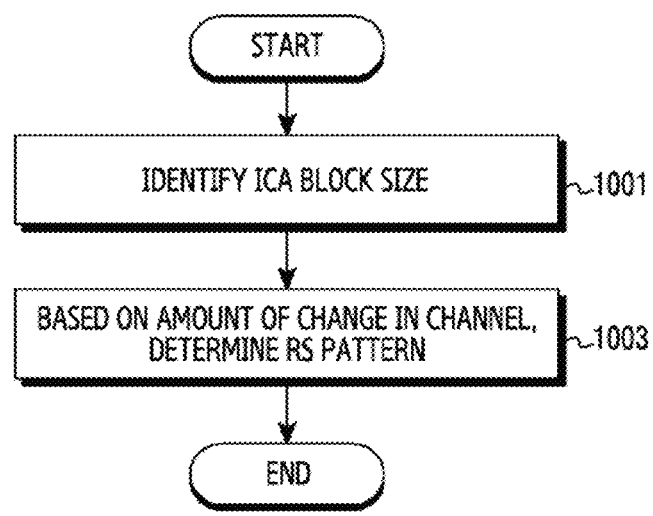
FIG. 10 illustrates an operating method of a receiving terminal for determining a reference signal (RS) pattern in a wireless communication system according to various embodiments of the present disclosure.

FIG. 10 illustrates an operating method of a receiving terminal 120 for determining a reference signal (RS) pattern in a wireless communication system according to various embodiments of the present disclosure. The procedure shown in FIG. 10 may be regarded as a detailed example of operation 603.

Referring to FIG. 10, the receiving terminal 120 may identify the size of an ICA block in operation 1001. This may be due to the fact that an RS pattern is determined to minimize the influence of the amount of change in the channel according to the size of an ICA block.

In operation 1003, the receiving terminal 120, based on the amount of change in the channel, may determine an RS pattern. In some embodiments, an optimization metric for determining an RS pattern may be determined as Equation 3 or Equation 4.

$$\max(\min(\alpha \min(d_i^f), (1-\alpha)\min(d_i^f))) \quad \text{[Equation 3]}$$

Here, $d_i^t$ denotes the distance between the RSs for a time domain, $d_i^f$ denotes the distance between the RSs for a frequency domain, and $\alpha$ denotes a weight for a time domain and a frequency domain.

$$\min\left(\alpha \sum_i d_i^f + (1-\alpha)\sum_i d_i^t\right) \quad \text{[Equation 4]}$$

Here, $d_i^t$ denotes the distance between the RSs for a time domain, $d_i^f$ denotes the distance between the RSs for a frequency domain, and $\alpha$ denotes a weight for a time domain and a frequency domain.

Figure 11A:
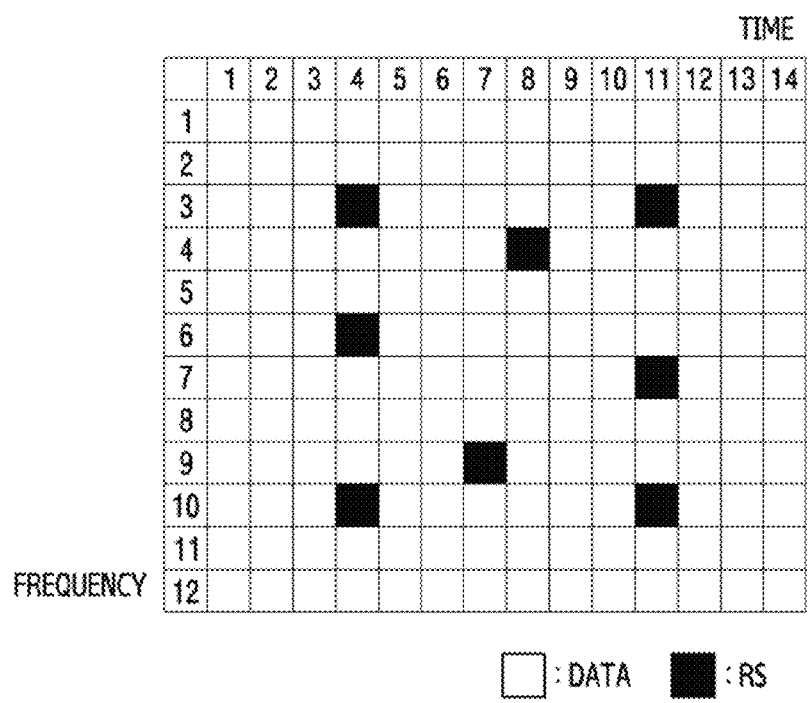
FIGS. 11A to 11C illustrate examples of an RS pattern in a wireless communication system according to various embodiments of the present disclosure.
Figure 11B:
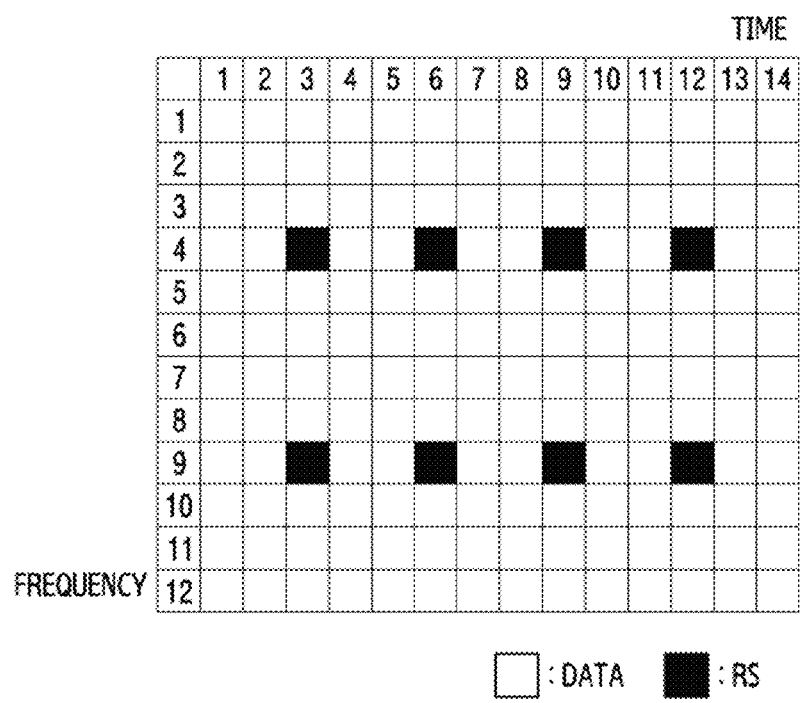
Figure 11C:
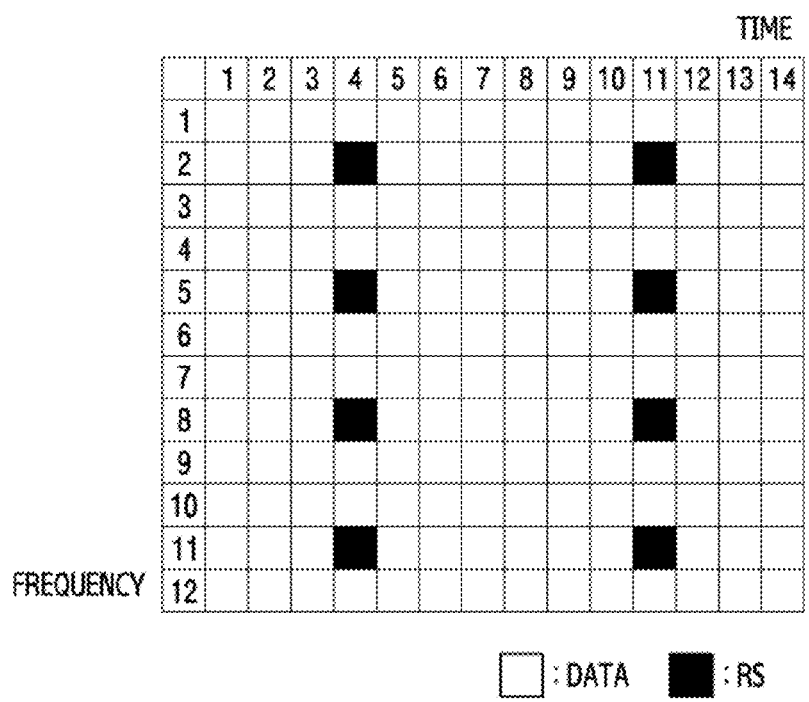

That is, the receiving terminal 120, based on the amount of change in the channel for a time domain and a frequency domain, may calculate the distance between the RSs for a time domain and the distance between the RSs for a frequency domain, thereby determining an optimal RS pattern. For example, provided that the size of an ICA block is 1 RB in a time domain and 1 RB in a frequency domain, referring to FIG. 11A, if the amount of change in the channel for a time domain is similar to the amount of change in the channel for a frequency domain, based on the distance between the RSs for a time domain and the distance between the RSs for a frequency domain, the RSs may be uniformly distributed in the ICA block. Referring to FIG. 11B, if the amount of change in the channel for a time domain is greater than the amount of change in the channel for a frequency domain, the RSs may be distributed to be denser for the time domain. Referring to FIG. 11C, if the amount of change in the channel for a time domain is not greater than the amount of change in the channel for a frequency domain, the RSs may be distributed to be denser for the frequency domain in the ICA block.

Figure 12A:
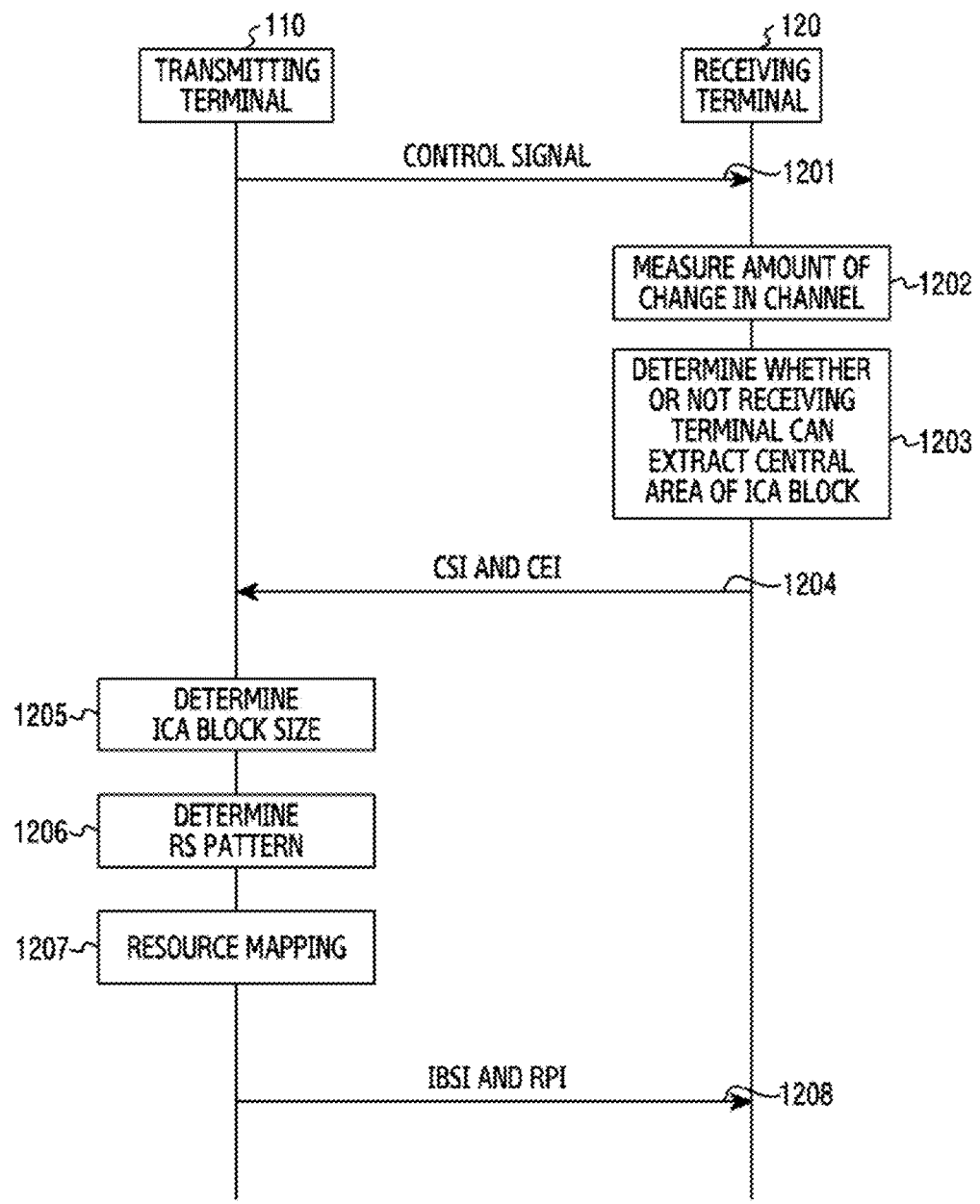
FIGS. 12A to 12C illustrate signal exchanges for determining the size of an ICA block and an RS pattern in a wireless communication system according to various embodiments of the present disclosure.

FIG. 12A illustrates signal exchanges for determining the size of an ICA block and an RS pattern in a wireless communication system according to various embodiments of the present disclosure.

Referring to FIG. 12A, the transmitting terminal 110 may transmit a control signal to the receiving terminal 120 in operation 1201. In some embodiments, the transmitting terminal 110 may transmit, to the receiving terminal 120, a signal for measuring the amount of change in the channel.

In operation 1202, the receiving terminal 120 may measure the amount of change in the channel. In some embodiments, the amount of change in the channel may be determined based on the control signal.

In operation 1203, the receiving terminal 120 may determine whether or not the receiving terminal 120 can extract a central area of the ICA block. This may be due to the fact that the RS pattern varies depending on whether or not the receiving terminal 120 can extract the central area of the ICA block.

In operation 1204, the receiving terminal 120 may transmit a CSI and a CEI to the transmitting terminal 110. In some embodiments, the CSI may refer to information indicating the amount of change in the channel. In other embodiments, the CEI may refer to information indicating whether or not the receiving terminal 120 can extract the central area of the ICA block.

In operation 1205, the transmitting terminal 110 may determine the size of the ICA block. The size of the ICA block may be determined based on the CSI. In operation 1206, the transmitting terminal 110 may determine an RS pattern. The RS pattern may be determined based on the ICA block size, the CSI, and the CEI. In operation 1207, the transmitting terminal 110 may map resources. The resources may be mapped based on the RS pattern.

In operation 1208, the transmitting terminal 110 may transmit an IBSI and an RPI to the receiving terminal 120. For example, referring to FIG. 13, if the amount of change in the channel for a frequency domain is greater than a second threshold value $\gamma_f$, the first bit of the IBSI may be set to 0, and if the amount of change in the channel for a frequency domain is less than a second threshold value $\gamma_f$, the first bit of the IBSI may be set to 1. In addition, if the amount of change in the channel for a time domain is greater than a first threshold value the first bit of the IBSI may be set to 0, and if the amount of change in the channel for a time domain is less than a first threshold value $\gamma_f$, the second bit of the IBSI may be set to 1. In this case, if the bit of the IBSI corresponding to each of the time domain and the frequency domain is 0, the influence of the amounts of changes in the channels for a time domain and a frequency domain on the performance degradation of the ICA is dominant. Thus, the ICA block size may be set to 0.5 RB. On the other hand, if the bit of the IBSI corresponding to each of the time domain and the frequency domain is 1, the ICA block size may be set to 1 RB in order to improve the performance of the ICA according to an increase in the number of reception signal samples. In some embodiments, the IBSI may refer to information indicating the size of the ICA block. In some embodiments, the RPI may refer to information indicating an RS pattern.

Figure 12B:
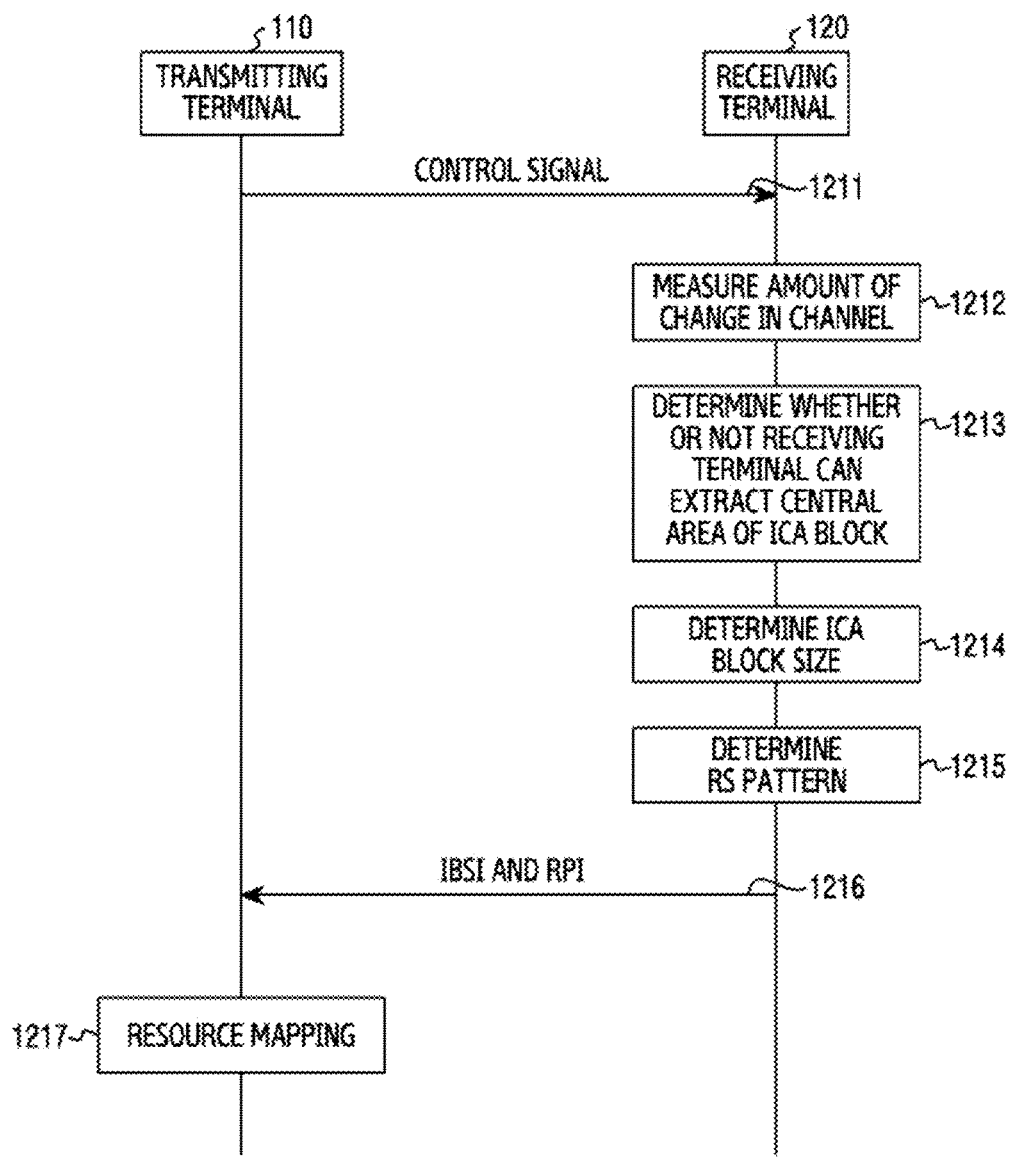

FIG. 12B illustrates other signal exchanges for determining the size of an ICA block and an RS pattern in a wireless communication system according to various embodiments of the present disclosure.

Referring to FIG. 12B, in operation 1211, the transmitting terminal 110 may transmit a control signal to the receiving terminal 120. In some embodiments, the transmitting terminal 110 may transmit, to the receiving terminal 120, a signal for measuring the amount of change in the channel. In operation 1212, the receiving terminal 120 may measure the amount of change in the channel. In some embodiments, the amount of change in the channel may be determined based on the control signal.

In operation 1213, the receiving terminal 120 may determine whether or not the receiving terminal 120 can extract a central area of the ICA block. This may be due to the fact that the RS pattern varies depending on whether or not the receiving terminal 120 can extract the central area of the ICA block. In operation 1214, the receiving terminal 120 may determine the size of the ICA block. The ICA block size may be determined based on the amount of change in the channel.

In operation 1215, the receiving terminal 120 may determine an RS pattern. The RS pattern may be determined based on whether or not the receiving terminal 120 can extract a central area of the ICA block, based on the ICA block size, and based on the amount of change in the channel. For example, referring to FIG. 14A, if the receiving terminal 120 cannot extract the central area of the ICA block, the RSs may be uniformly distributed in the ICA block as indicated by a bold solid line 1401 to have robustness with respect to channel variation. If the receiving terminal 120 can extract the central area of the ICA block, since the receiving terminal 120 performs ICA while moving the ICA block, the receiving terminal 120 further performs ICA in the ICA block indicated by a dotted line 1403. In this case, there is a problem that the RSs are disposed at the edge of the ICA block indicated by the dotted line 1403. Accordingly, referring to FIG. 14B, if the receiving terminal 120 can extract the central area of the ICA block, the RSs may be disposed in consideration of the ICA block indicated by the dotted line 1403.

In operation 1216, the receiving terminal 120 may transmit an IBSI and an RPI to the transmitting terminal 110. In some embodiments, the IBSI may refer to information indicating the size of the ICA block. In other embodiments, the RPI may refer to information indicating an RS pattern. In operation 1217, the transmitting terminal 110 may map resources. The resources may be mapped based on the RS pattern.

Figure 12C:
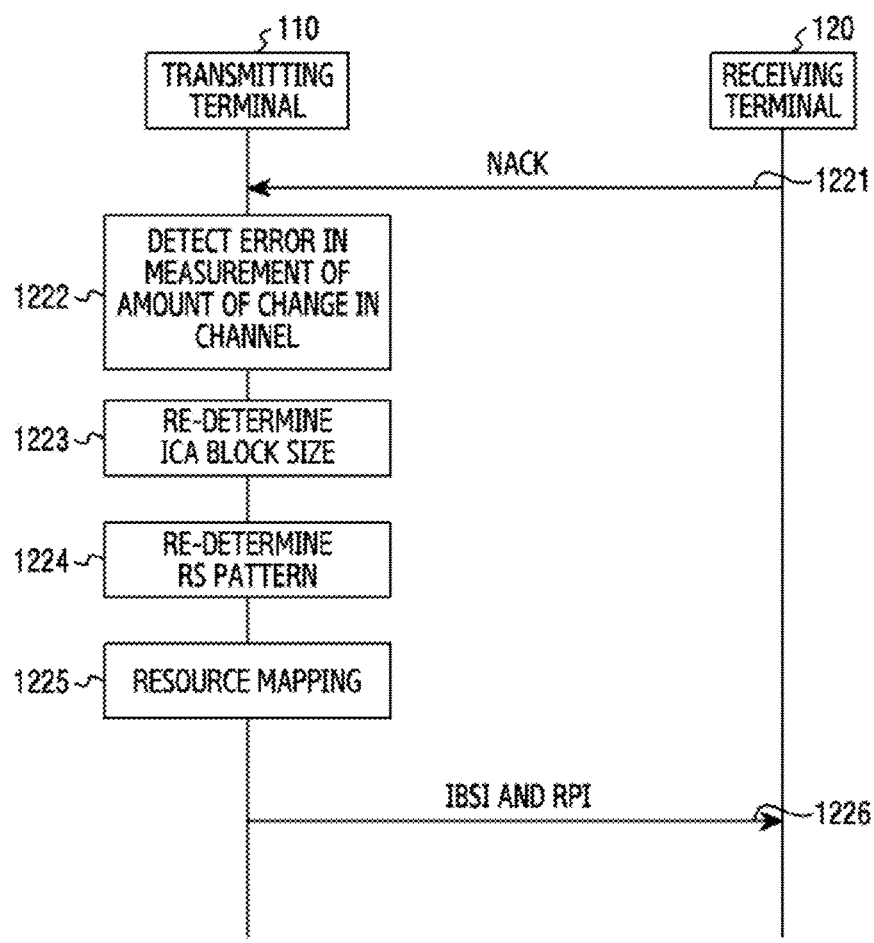
Figure 13:
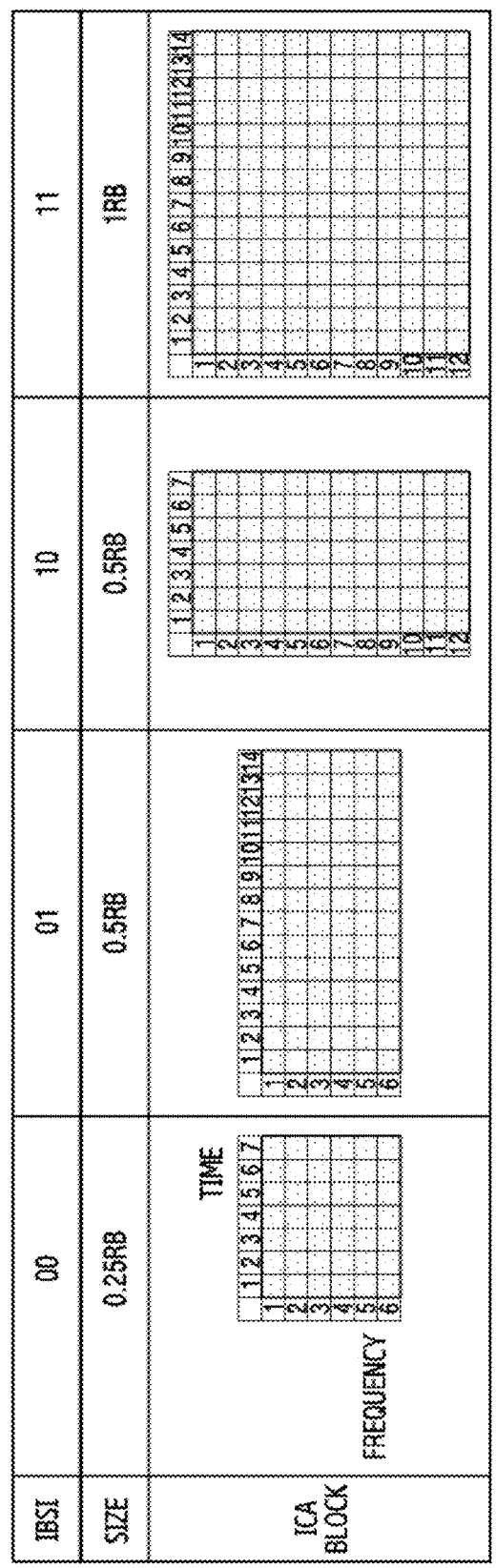
FIG. 13 illustrates an example of the size of an ICA block in a wireless communication system according to various embodiments of the present disclosure.
Figure 14A:
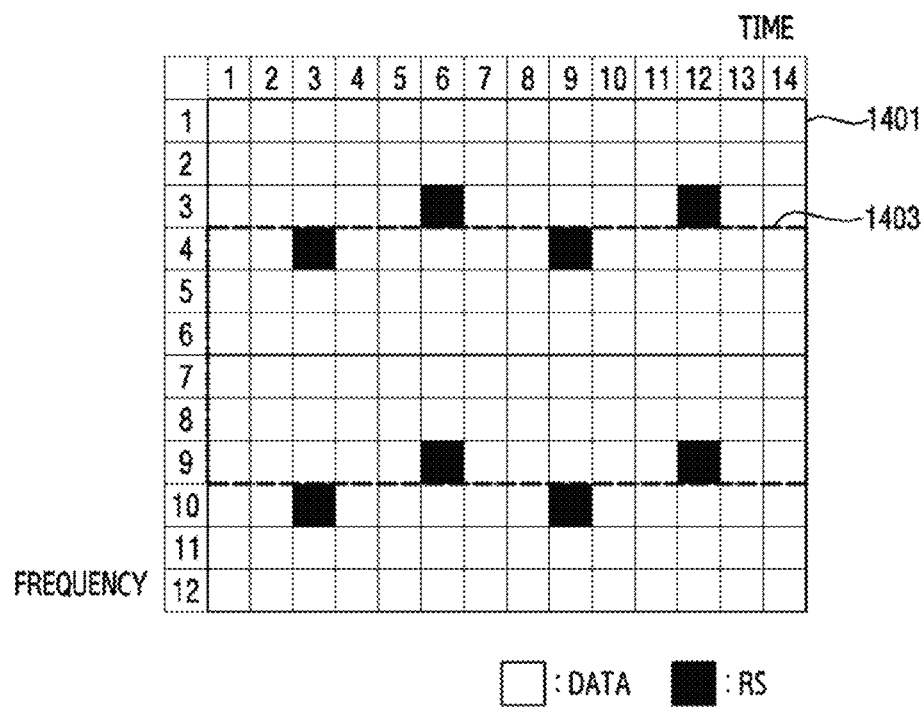
FIGS. 14A and 14B illustrate an example of re-determining an RS pattern in a wireless communication system according to various embodiments of the present disclosure.
Figure 14B:
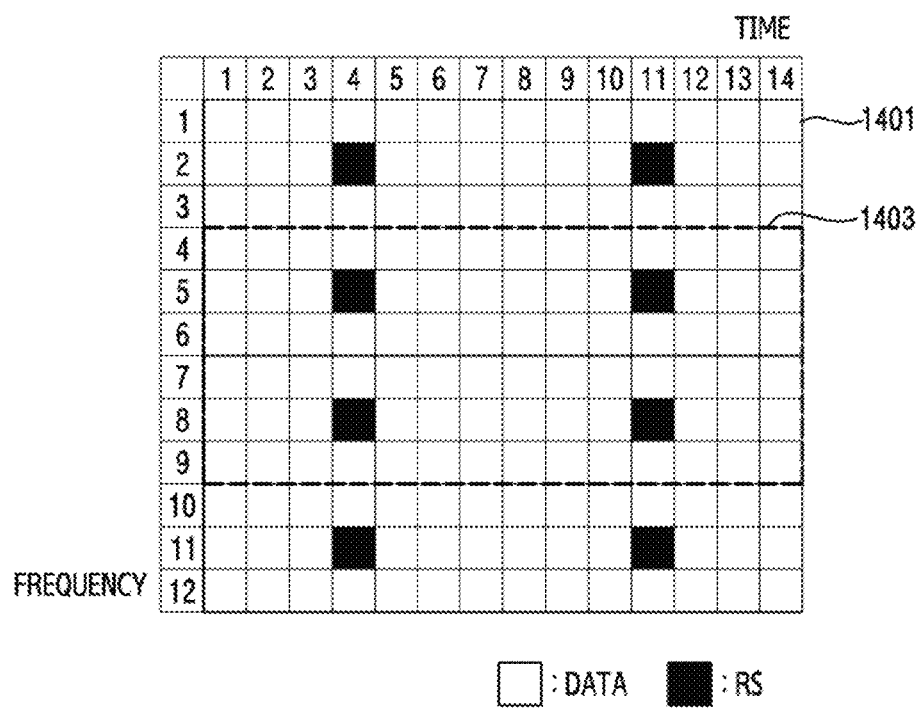

FIG. 12C illustrates other signal exchanges for determining the size of an ICA block and an RS pattern in a wireless communication system according to various embodiments of the present disclosure.

Referring to FIG. 12C, in operation 1221, the receiving terminal 120 may transmit negative acknowledgment (NACK) to the transmitting terminal 110. The transmitting terminal 110 that has received the NACK may determine that the size of the ICA block and the RS pattern, which have been previously determined, are not appropriate.

In operation 1222, the transmitting terminal 110, in response to reception of the NACK, may detect an error in the amount of change in the channel, which has been previously determined. In some embodiments, the transmitting terminal 110 may detect an error in the previously determined amount of change in the channel, and may then measure a new amount of change in the channel.

In operation 1223, the transmitting terminal 110 may re-determine the size of the ICA block. The size of the ICA block may be re-determined based on the new amount of change in the channel. In operation 1224, the transmitting terminal 110 may re-determine the RS pattern. The RS pattern may be re-determined based on the re-determined ICA block size and the new amount of change in the channel. In operation 1225, the transmitting terminal 110 may remap resources. The resources may be remapped based on the re-determined RS pattern.

In operation 1226, the transmitting terminal 110 may transmit an IBSI and an RPI to the receiving terminal 120. In some embodiments, the RPI may refer to an index of a codebook according to the RS pattern. In other embodiments, the RPI may refer to information on the offset and distance for the position of the RS. In other embodiments, the RPI may refer to information on the number of RSs or the density of RSs based on the predetermined RS pattern.

Figure 15:
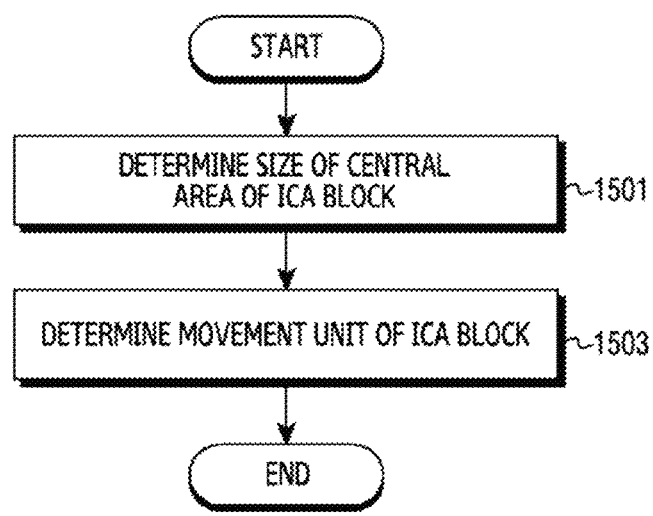
FIG. 15 illustrates an operating method of a receiving terminal for extracting a central area of an ICA block in a wireless communication system according to various embodiments of the present disclosure.
Figure 16A:
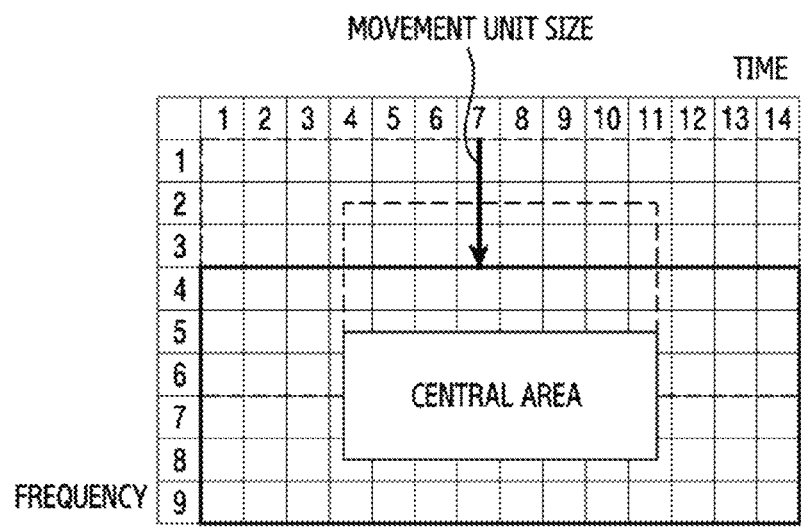
FIGS. 16A and 16B illustrate examples of a movement unit of a central area of an ICA block in a wireless communication system according to various embodiments of the present disclosure.
Figure 16B:
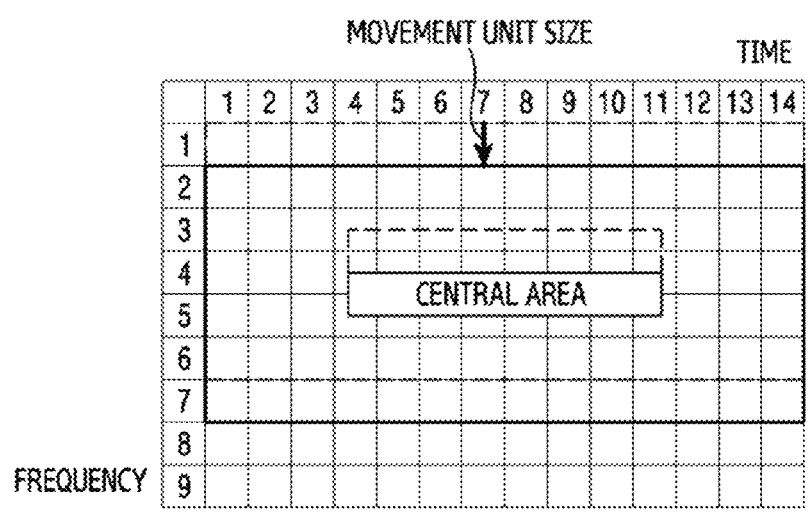

FIG. 15 illustrates an operating method of a receiving terminal 120 for extracting a central area of an ICA block in a wireless communication system according to various embodiments of the present disclosure. The procedure shown in FIG. 15 may be regarded as a detailed example of operation 605.

Referring to FIG. 15, in operation 1501, the receiving terminal 120, based on the amount of change in the channel, may determine the size of a central area of an ICA block. More specifically, if the amount of change in the channel is greater than a third threshold value, since a reliable central area of the ICA block becomes smaller, the receiving terminal 120 may set the size of the central area of the ICA block to be small. On the other hand, if the amount of change in the channel is less than a third threshold value, since a reliable central area of the ICA block becomes large, the receiving terminal 120 may set the size of the central area of the ICA block to be large.

In operation 1503, the receiving terminal 120 may determine a movement unit of the ICA block depending on the size of the central area of the ICA block. For example, referring to FIG. 16A, since the union of the central areas of the ICA block includes all of the resources, if the central area of the ICA block is set to be large, the movement unit of the ICA block may also be set to be large. On the other hand, referring to FIG. 16B, when the central area of the ICA block is set to be small, the movement unit of the ICA block may also be set to be small.

Figure 17:
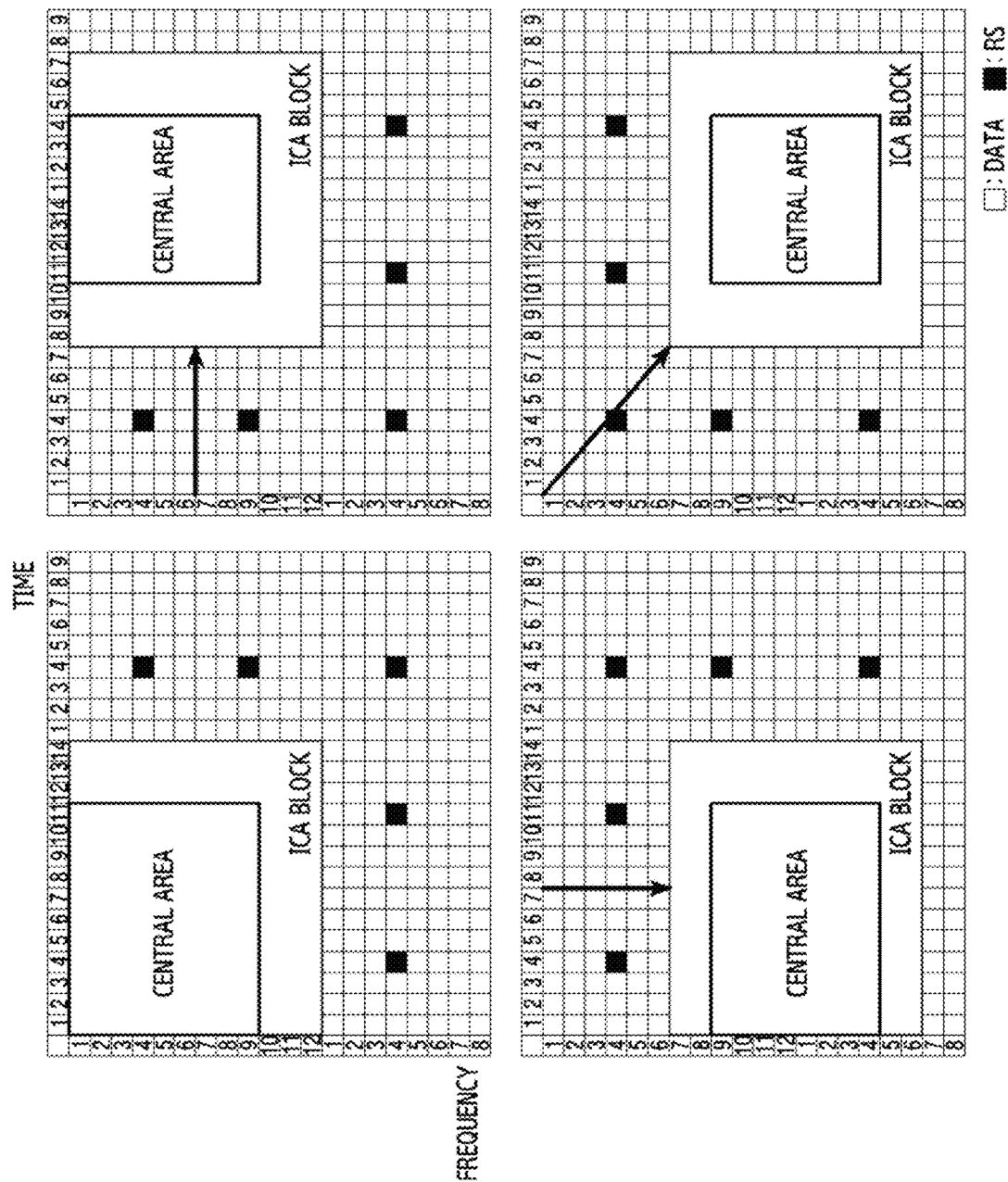
FIG. 17 illustrates an example of extracting a central area of an ICA block in a wireless communication system according to various embodiments of the present disclosure.

For example, referring to FIG. 17, the receiving terminal 120 may collect reception signal samples in the unit of an ICA block, and may calculate a whitening matrix and a rotating matrix for performing ICA. The receiving terminal 120 may extract the central area of the ICA block, and may decode reception signals. Thereafter, the receiving terminal 120 may repeatedly perform the above-described decoding while moving the ICA block according to the movement unit of the ICA block.

Figure 18:
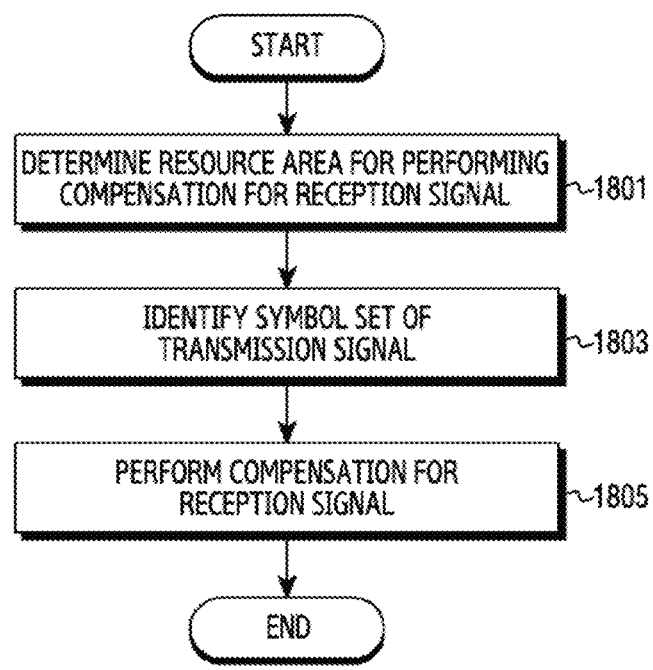
FIG. 18 illustrates an operating method of a receiving terminal for compensating for a reception signal in a wireless communication system according to various embodiments of the present disclosure.
Figure 19:
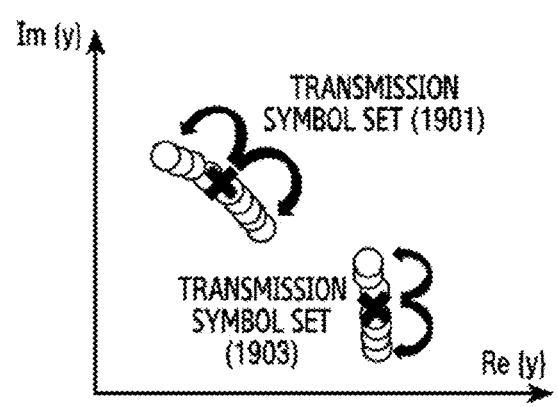
FIG. 19 illustrates an example of separating a symbol set of a transmission signal in a wireless communication system according to various embodiments of the present disclosure.

FIG. 18 illustrates an operating method of a receiving terminal 120 for compensating for reception signals in a wireless communication system according to various embodiments of the present disclosure. The procedure shown in FIG. 18 may be regarded as a detailed example of operation 607.

Referring to FIG. 18, in operation 1801, the receiving terminal 120 may determine a resource area for performing compensation for reception signals in consideration of the amount of change in the channel. Since the ICA performance is improved as the number of reception signal samples increases, it is preferable to compensate for reception signals over the widest possible resource area. On the other hand, as the resource area for performing correction increases, the amount of change in the channel also increases, which makes it difficult to estimate the amount of change in the channel. Accordingly, the receiving terminal 120 may consider the amount of change in the channel when determining the resource area for compensating for the reception signals. In some embodiments, assuming a MIMO system in which the transmitting terminal 110 has two transmitting antennas and the receiving terminal 120 has a single receiving antenna, the reception signal that has passed through a selective channel may be expressed as Equation 5 below.

$$y(f, t) = [h_1(f, t) \quad h_2(f, t)] \begin{bmatrix} s_1(f, t) \\ s_2(f, t) \end{bmatrix}$$ [Equation 5]

Here, y(f, t) denotes the reception signal, $h_1$(f, t) and $h_2$(f, t) denote channel components, and $s_1$(f, t) and $s_2$(f, t) denote transmission symbols.

In operation 1803, the receiving terminal 120 may identify a symbol set of the transmission signal. Hereinafter, the symbol set of the transmission signal will be referred to as a "transmission symbol set" for the convenience of explanation. For example, referring to FIG. 19, the transmission symbol sets may be separated into a transmission symbol set 1901 and a transmission symbol set 1903. This is due to the fact that compensation for the transmission symbol set 1901 and the transmission symbol set 1903 is performed, respectively, because influences on the reception signals are different depending on the transmission symbol set 1901 and the transmission symbol set 1903 even with the same amount of change in the channel. In some embodiments, the transmission symbol set may be expressed as Equation 6 below.

$$s=[s_1 s_2]^T$$ [Equation 6]

Here, "s" denotes the transmission symbol set, and $s_1$ and $s_2$ denote transmission symbols.

In operation 1805, the receiving terminal 120 may compensate for reception signals using a transmission symbol set. More specifically, the receiving terminal 120 may determine a reception signal as a linear polynomial surface by measuring a variation of a reception signal for each transmission symbol set as in Equation 7 below.

$$y(f,t)=\hat{p}_{y,10}f+\hat{p}_{y,01}t+\hat{p}_{y,00}$$ [Equation 7]

Here, y(f, t) denotes the reception signal, $\hat{p}_{y,10}$ denotes the coefficient of a frequency domain, $\hat{p}_{y,01}$ denotes the coefficient of a time domain, and $\hat{p}_{y,00}$ denotes a power value when the time and frequency are zero, respectively.

In the case where the receiving terminal 120, based on the amount of change in the channel, determines the size of an ICA block and a resource area for performing compensation, the amount of change in the channel in the resource area may be linearly expressed as Equation 8 below.

$$h_1(f,t)=p_{1,10}f+p_{1,01}t+p_{1,00}$$

$$h_2(f,t)=p_{2,10}f+p_{2,01}t+p_{2,00}$$ [Equation 8]

Here, $h_1$(f, t) and $h_2$(f, t) denote channel components, $p_{1,10}$, $p_{2,10}$, $p_{1,01}$, and $p_{2,01}$ denote channel coefficients, and $p_{1,00}$ and $p_{2,00}$ denote channel values when the time and frequency are zero, respectively.

Figure 20:
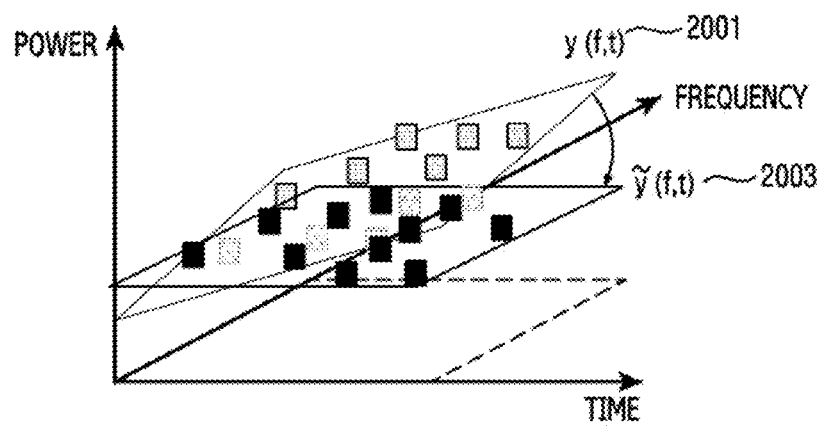
FIG. 20 illustrates an example of compensating for a reception signal in a wireless communication system according to various embodiments of the present disclosure.

In this case, referring to FIG. 20, the reception signal 2001 expressed as a linear polynomial surface may be compensated for so as to be a reception signal 2003. For example, by applying Equation 8 to Equation 5, the reception signal 2001 may be expressed as Equation 9 below.

$$\begin{aligned}y(f, t) &= h_1(f, t)s_1 + h_2(f, t)s_2 \\ &= (p_{1,10}s_1 + p_{2,10}s_2)f + (p_{1,01}s_1 + p_{2,01}s_2)t + \\ &\quad (p_{1,00}s_1 + p_{2,00}s_2)\end{aligned}$$ [Equation 9]

Here, y(f, t) denotes the reception signal 2001, $h_1$(f, t) and $h_2$(f, t) denote channel components, $s_1$ and $s_2$ denote transmission symbols, $p_{1,10}$, $p_{2,10}$, $p_{1,01}$, and $p_{2,01}$ denote channel coefficients, and $p_{1,00}$ and $p_{2,00}$ denote channel values when the time and frequency are zero, respectively.

Estimated values $\hat{p}_{1,10}$, $\hat{p}_{1,01}$, $\hat{p}_{2,10}$, $\hat{p}_{2,01}$ of the channel coefficients in Equation 8 may be obtained by comparing Equation 9 with Equation 7.

Therefore, the compensated reception signal 2003, based on the estimated channel coefficients and the positions of the resource elements (REs) in the resource area, may be expressed as Equation 10 below.

$$\tilde{y}(f,t)=y(f,t)-\Delta y(f,t)$$ [Equation 10]

Here, ỹ(f,t) denotes the compensated reception signal 2003, y(f, t) denotes the reception signal 2001, and Δy(f,t)

denotes a compensation value of the reception signal 2001. In this case, $\Delta y(f,t) = \Delta h_1(f,t)s_1 + \Delta h_2(f,t)s_2$ and $\Delta h_i(f,t) = \hat{p}_{i,10}(f-f_0) + \hat{p}_{i,11}(t-t_0)$, i=1, 2.

Figure 21:
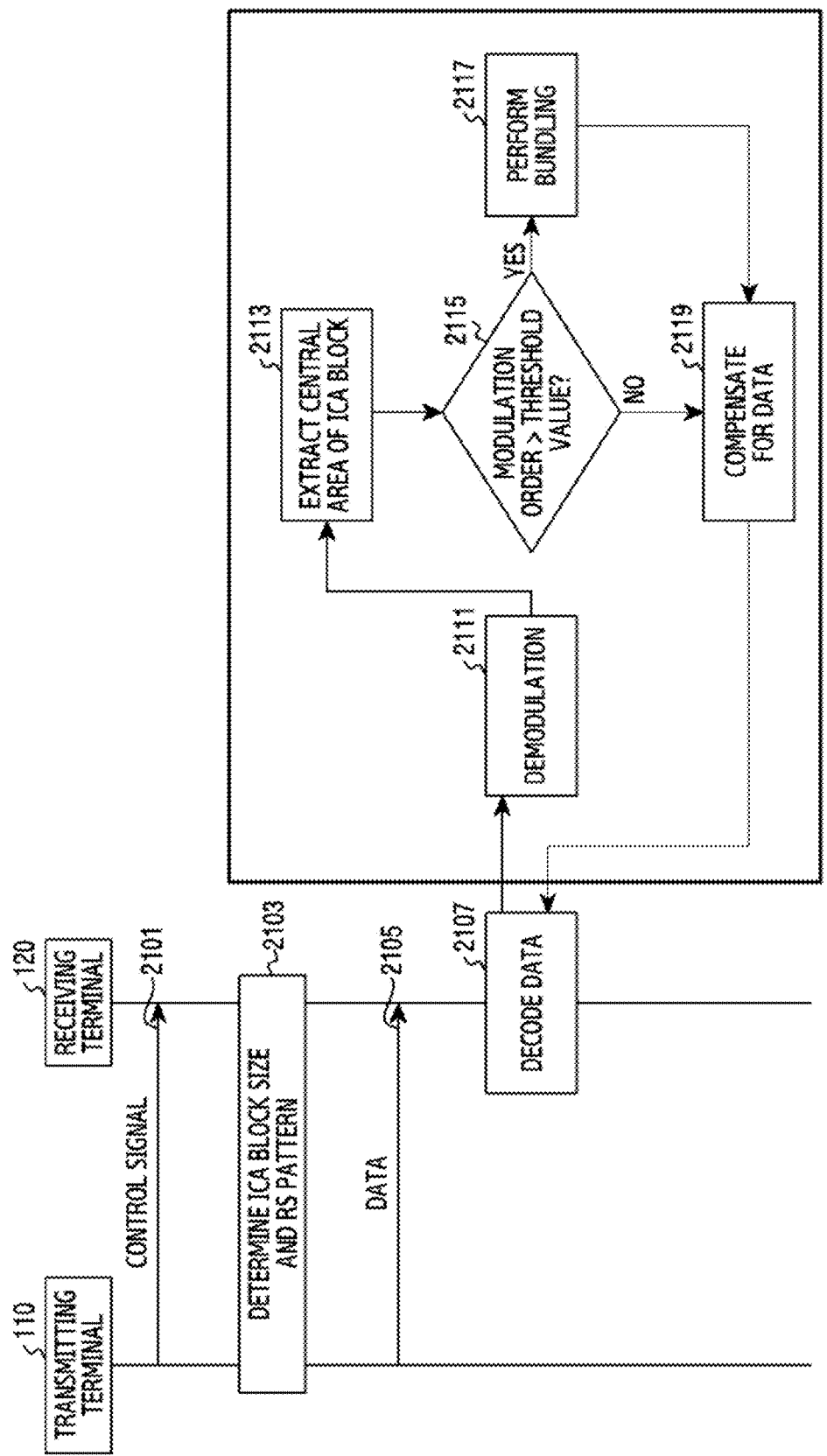
FIG. 21 illustrates a signal exchange for decoding signals using an ICA technique in a wireless communication system according to various embodiments of the present disclosure.

FIG. 21 illustrates signal exchanges for decoding signals using an ICA technique in a wireless communication system according to various embodiments of the present disclosure. FIG. 21 illustrates signal exchanges between the transmitting terminal 110 and the receiving terminal 120.

Referring to FIG. 21, in operation 2101, the transmitting terminal 110 may transmit a control signal to the receiving terminal 120. In some embodiments, the transmitting terminal 110 may transmit, to the receiving terminal 120, a signal for measuring the amount of change in the channel.

In operation 2103, the transmitting terminal 110 may perform a signaling procedure with the receiving terminal 120, thereby determining the size of an ICA block and an RS pattern. The transmitting terminal 110 or the receiving terminal 120 may determine the ICA block size and the RS pattern, and may transmit information indicating the determined ICA block size and RS pattern to the other party (i.e., the receiving terminal 120 or the transmitting terminal 110). In operation 2105, the transmitting terminal 110 may transmit data to the receiving terminal 120. The data may be encoded data.

In operation 2107, the receiving terminal 120 may decode the data using an ICA technique considering the amount of change in the channel. More specifically, in operation 2111, the receiving terminal 120 may demodulate the data. The demodulation may mean OFDM demodulation. In operation 2113, the receiving terminal 120 may determine a central area of the ICA block. The central area of the ICA block may be determined according to the amount of change in the channel.

In operation 2115, the receiving terminal 120 may determine whether or not the modulation order is greater than a threshold value. The modulation order may be used to determine the number of transmission symbol sets. That is, the higher the modulation order, the larger the number of transmission symbol sets.

In operation 2117, if the modulation order is greater than the threshold value, the receiving terminal 120 may perform bundling. The case where the modulation order is greater than the threshold value may refer to the case where the number of reception signal samples corresponding to each transmission symbol set is small. In addition, bundling may mean determination of a resource area to perform compensation for the reception signals. Since the total number of reception signal samples is limited, as the number of transmission symbol sets increases (that is, as the modulation order becomes higher), the number of reception signal samples corresponding to each transmission symbol set may decrease. If the number of reception signal samples corresponding to each transmission symbol set decreases, determination of the reception signal using a linear polynomial surface as in Equation 7 may yield inaccurate results. Therefore, in order to keep the number of reception signal samples corresponding to each transmission symbol set sufficiently large, it is necessary to increase the total number of reception signal samples. To this end, bundling may be performed in order to use a large area for performing compensation for the reception signal.

In operation 2119, the receiving terminal 120 may perform compensation for the reception signal. That is, if the modulation order is greater than the threshold value, the compensation for the reception signal may be performed after the bundling is performed. On the other hand, if the modulation order is not greater than the threshold value, since the number of reception signal samples corresponding to each transmission symbol set is sufficiently large, compensation for the reception signal may be performed without performing a separate bundling process.

Figure 22A:
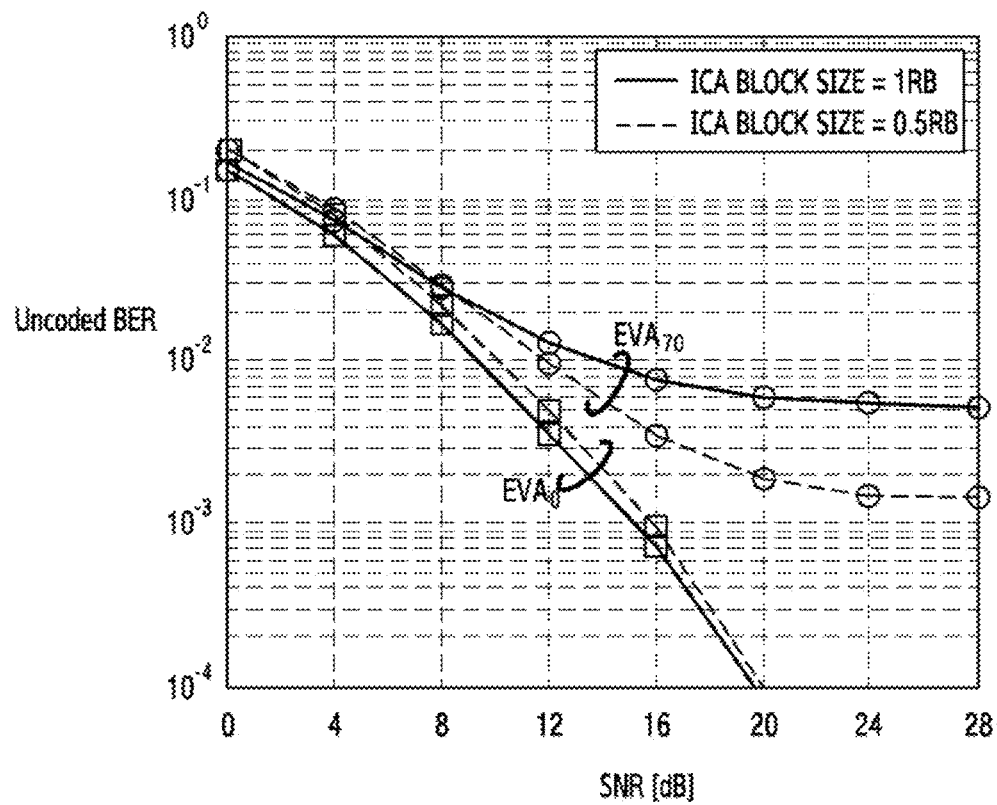
FIGS. 22A to 22C illustrate decoding performance graphs using ICA in a wireless communication system according to various embodiments of the present disclosure.
Figure 22B:
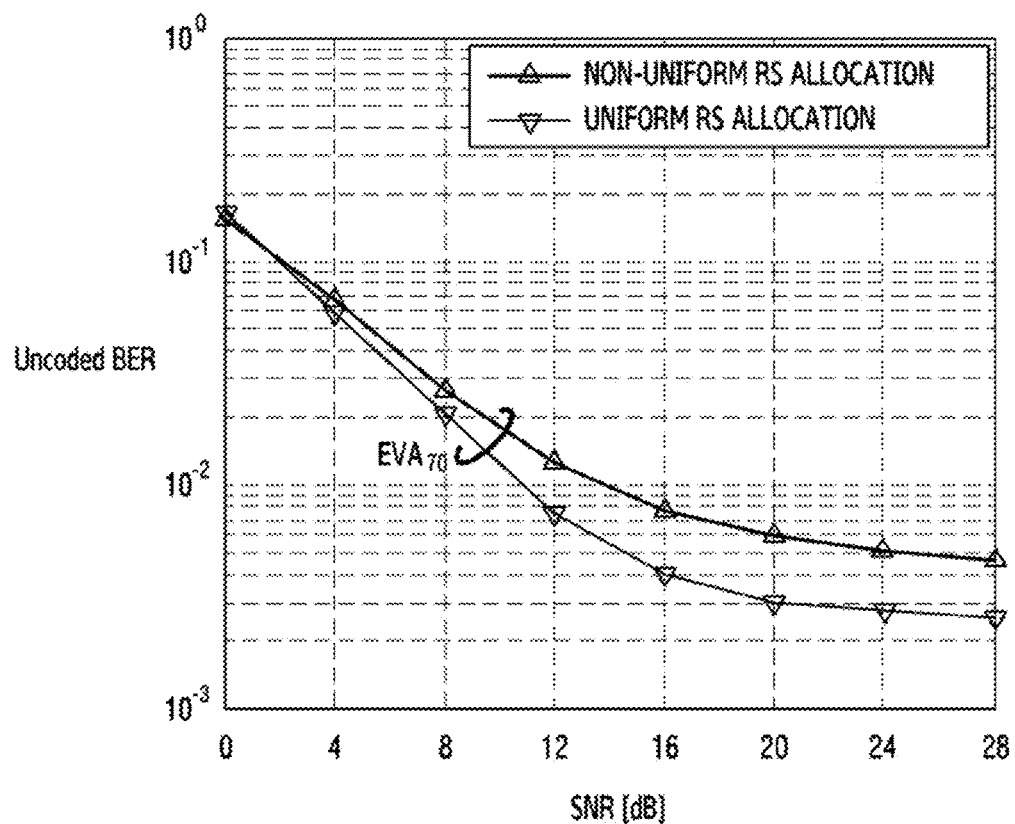
Figure 22C:
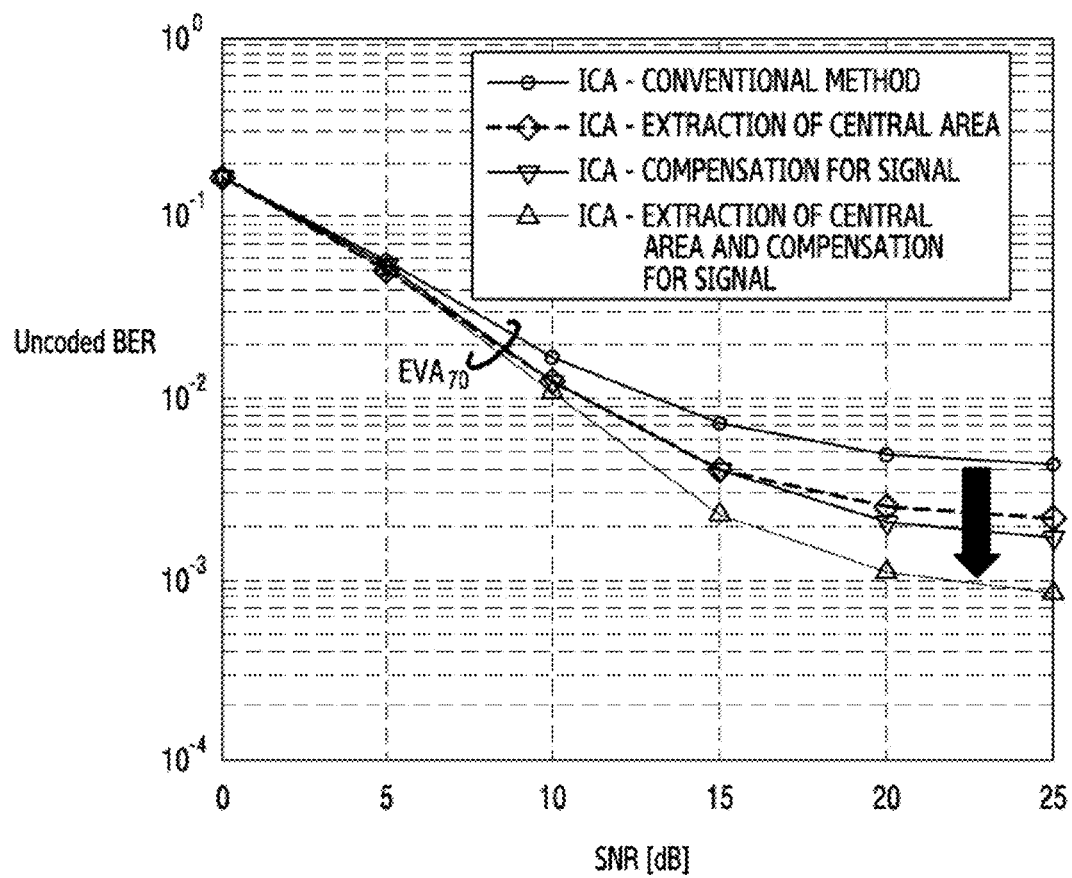

FIGS. 22A to 22C show performance graphs of decoding using ICA in a wireless communication system according to various embodiments of the present disclosure.

An ICA-based semi-blind technique can reduce overhead due to the RS, compared to an RS-based channel estimation technique. The RS is used to solve the ambiguity problems in the course of performing ICA, but the ICA-based technique can obtain sufficient performance using 4 to 8 RSs, which correspond to ⅙ to ⅓ of RSs in the existing LTE. An ICA-based receiving technique may allocate data to the existing resources for the RS because overhead due to the RS is reduced. Therefore, when a transmission block of the same length is transmitted, since a large redundancy may be secured by rate matching, the effective coding rate may be improved. This means improvement of BLER (block error rate) performance and improvement of throughput performance. When eight RSs are used, the effective coding rate for modulation and coding schemes (MCSs) 3, 6, and 9 may be defined as shown in Table 3 below.

TABLE 3

|  | MCS | Size of transmission block | Number of transmission symbols | Effective coding rate |
| --- | --- | --- | --- | --- |
| LTE | 3 | 176 | 432 | 0.2037 |
|  | 6 | 256 | 432 | 0.2963 |
|  | 9 | 456 | 432 | 0.5278 |
| ICA | 3 | 176 | 480 | 0.1833 |
|  | 6 | 256 | 480 | 0.2667 |
|  | 9 | 456 | 480 | 0.4750 |

Here, the number of transmission symbols denotes the number of symbols that can be transmitted through a single subframe when resources of 3 RBs are allocated. Referring to Table 3, it can be seen that the effective coding rate of the ICA-based communication system has been improved as compared with that of the RS-based LTE. In the case of performance evaluation, it is assumed that 3 RBs are allocated for one subframe in a MIMO system in which the transmitting terminal 110 has two transmitting antennas and the receiving terminal 120 has three receiving antennas.

FIG. 22A illustrates a BER (bit error rate) performance graph according to determination of the ICA block size, based on the amount of change in the channel. Since the amount of change in the channel is not large in an extended pedestrian A (EPA) channel, the gain resulting from obtainment of the reception signal sample is dominant. Thus, the BER performance is better when the ICA block size is 1 RB. On the other hand, since the amount of change in the channel is large in an extended vehicular A (EVA) channel, the loss resulting from an increase in the amount of change in the channel is more than the gain resulting from the obtainment of the reception signal sample. Thus, the BER performance is better when the ICA block size is 0.5 RB.

FIG. 22B shows a BER performance graph according to disposition of RSs. Considering above Equations 3 and 4, the BER performance is better when the RSs are uniformly disposed than when the RSs are non-uniformly disposed.

FIG. 22C shows a BER performance graph in the case where a central area of the ICA block is extracted and in the case where the reception signal is compensated for. In this case, the BER performance of the ICA in the case where the central area of the ICA block is extracted or in the case where the reception signal is compensated for is better than that of the conventional ICA. In addition, the BER performance of the ICA in the case where the central area of the ICA block is extracted and where the reception signal is compensated for is better than that of the ICA in the case where the central area of the ICA block is extracted or in the case where the reception signal is compensated for.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first electronic device in a wireless communication system, the method comprising:
    transmitting, to a second electronic device, information on capabilities of the first electronic device in relation to an independent component analysis (ICA) technique;
    receiving, from the second electronic device, a signal generated based on the information on the capabilities; and
    determining a size of an ICA block based on an amount of change in a channel for the signal;
    determining a reference signal (RS) pattern according to the size of the ICA block; and
    decoding the signal using the ICA technique in consideration of the determined RS pattern.

2. The method of claim 1, wherein the information on the capabilities of the first electronic device comprises at least one part of information explicitly indicating whether or not the first electronic device can support the ICA technique, information indicating whether or not the first electronic device supports other capabilities for supporting the ICA technique, or information indicating whether or not the first electronic device supports at least one capability related to the ICA technique.

3. The method of claim 1, wherein the determining the RS further comprises:
    determining a distance between RSs for a time domain based on the amount of change in the channel for the time domain;
    determining a distance between the RSs for a frequency domain in the ICA block based on the amount of change in the channel for the frequency domain; and
    determining disposition of the RSs based on the distance between the RSs for the time domain and the distance between the RSs for the frequency domain.

4. The method of claim 1, further comprising:
    transmitting, to the second electronic device, at least one part of first information indicating the amount of change in the channel, second information indicating whether or not a partial area of the ICA block can be determined as a decoding area, third information indicating the size of the ICA block, or fourth information indicating disposition of RSs.

5. The method of claim 1, further comprising:
    compensating for the signal based on the amount of change in the channel.

6. A method performed by a second electronic device in a wireless communication system, the method comprising:
    receiving, from a first electronic device, information on capabilities of the first electronic device in relation to an independent component analysis (ICA) technique; and
    transmitting, to the first electronic device, a signal generated based on the information on the capabilities in relation to the ICA technique,
    wherein a size of an ICA block is determined based on an amount of change in a channel for the signal,
    wherein a reference signal (RS) pattern is determined based on the size of the ICA block, and
    wherein the signal is decoded using the ICA technique in consideration of the determined RS pattern.

7. The method of claim 6, wherein the information on the capabilities of the first electronic device comprises at least one part of information explicitly indicating whether or not the first electronic device can support the ICA technique, information indicating whether or not the first electronic device supports other capabilities for supporting the ICA technique, or information indicating whether or not the first electronic device supports at least one capability related to the ICA technique.

8. A first electronic device in a wireless communication system, comprising:
    a transceiver; and
    a processor operatively connected to the transceiver and configured to:

control the transceiver to transmit, to a second electronic device, information on capabilities of the first electronic device in relation to an independent component analysis (ICA) technique, control the transceiver to receive, from the second electronic device, a signal generated based on the capabilities in relation to the ICA technique, determine a size of an ICA block based on an amount of change in a channel for the signal, determine a reference signal (RS) pattern according to the size of the ICA block, decode the signal using the ICA technique in consideration of the determined RS pattern.

9. The device of claim 8, wherein the information on the capabilities related to the ICA technique comprises at least one part of information explicitly indicating whether or not the first electronic device can support the ICA technique, information indicating whether or not the first electronic device supports other capabilities for supporting the ICA technique, or information indicating whether or not the first electronic device supports at least one capability related to the ICA technique.

10. The device of claim 8, wherein the processor is further configured to:
    determine a distance between RSs for a time domain based on the amount of change in the channel for the time domain;
    determine a distance between the RSs for a frequency domain in the ICA block based on the amount of change in the channel for the frequency domain; and
    determine disposition of the RSs, based on the distance between the RSs for the time domain and the distance between the RSs for the frequency domain.

11. The device of claim 8, wherein the processor is further configured to control the transceiver to transmit, to the second electronic device, at least one part of first information indicating the amount of change in the channel, second information indicating whether or not a partial area of the ICA block can be determined as a decoding area, third information indicating the size of the ICA block, or fourth information indicating disposition of RSs.

12. The device of claim 8, wherein the processor is further configured to compensate for the signal based on the amount of change in the channel.

* * * * *